United States Patent
Sutton

(10) Patent No.: US 8,125,974 B2
(45) Date of Patent: Feb. 28, 2012

(54) TRANSMIT EMISSION CONTROL IN A WIRELESS TRANSCEIVER

(75) Inventor: Todd R. Sutton, Del Mar, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 971 days.

(21) Appl. No.: 12/114,701

(22) Filed: May 2, 2008

(65) Prior Publication Data
US 2009/0274073 A1 Nov. 5, 2009

(51) Int. Cl.
*H04B 7/212* (2006.01)
*H04B 7/204* (2006.01)
*H04W 4/00* (2009.01)

(52) U.S. Cl. .................. 370/348; 370/319; 370/329

(58) Field of Classification Search .................. 370/348
See application file for complete search history.

(56) References Cited

U.S. PATENT DOCUMENTS

| | | | |
|---|---|---|---|
| 7,969,858 B2 * | 6/2011 | Laroia et al. .................. 370/208 |
| 2008/0240275 A1 * | 10/2008 | Cai .................. 375/260 |
| 2009/0116427 A1 * | 5/2009 | Marks et al. .................. 370/328 |
| 2010/0027446 A1 * | 2/2010 | Choi et al. .................. 370/280 |
| 2010/0074209 A1 * | 3/2010 | Montojo et al. .................. 370/329 |
| 2011/0058526 A1 * | 3/2011 | Seo et al. .................. 370/329 |

\* cited by examiner

*Primary Examiner* — Jeffrey Pwu
*Assistant Examiner* — Shaq Taha
(74) *Attorney, Agent, or Firm* — Volpe and Koenig, P.C.

(57) ABSTRACT

Methods and apparatus for control of uplink resource allocation and undesirable transmit emissions from a wireless transceiver in a frequency division duplex (FDD) or hybrid frequency division duplex (H-FDD) wireless system. The bandwidths spanned by the receive band and the transmit band may be symmetric or asymmetric. Additionally, each of the receive band or the transmit band may be contiguous or may be an aggregate of multiple discontinuous frequency bands. The wireless transceiver can control undesirable transmit emissions from occurring in a predetermined frequency band by using an offset LO frequency and restricting transmit signals to frequencies away from the predetermined frequency band. Alternatively, in an asymmetric FDD system where a receive band is larger than a transmit band, the transceiver can limit transmit signal allocation to the transmit band. The transceiver can further limit out of band transmit emissions using an offset LO frequency.

20 Claims, 12 Drawing Sheets

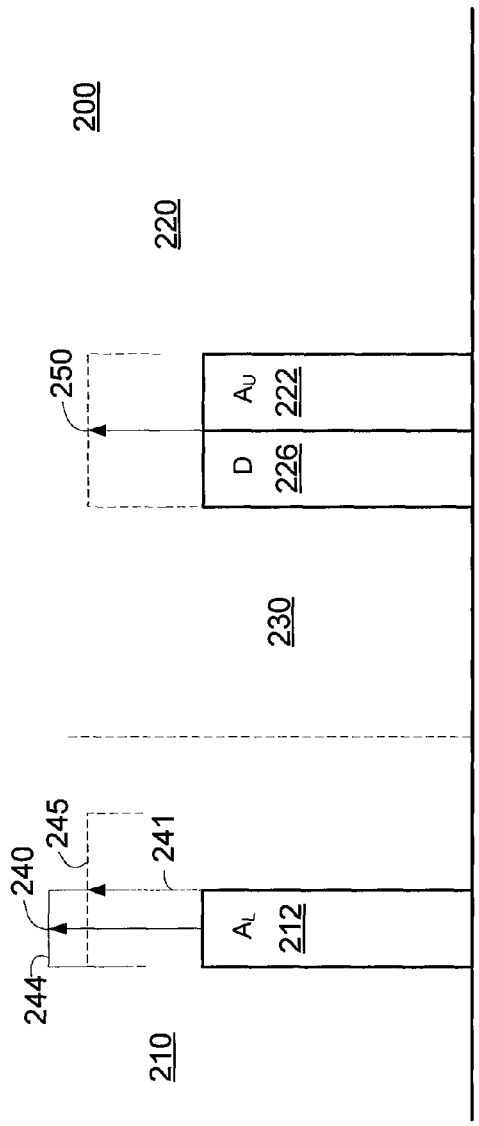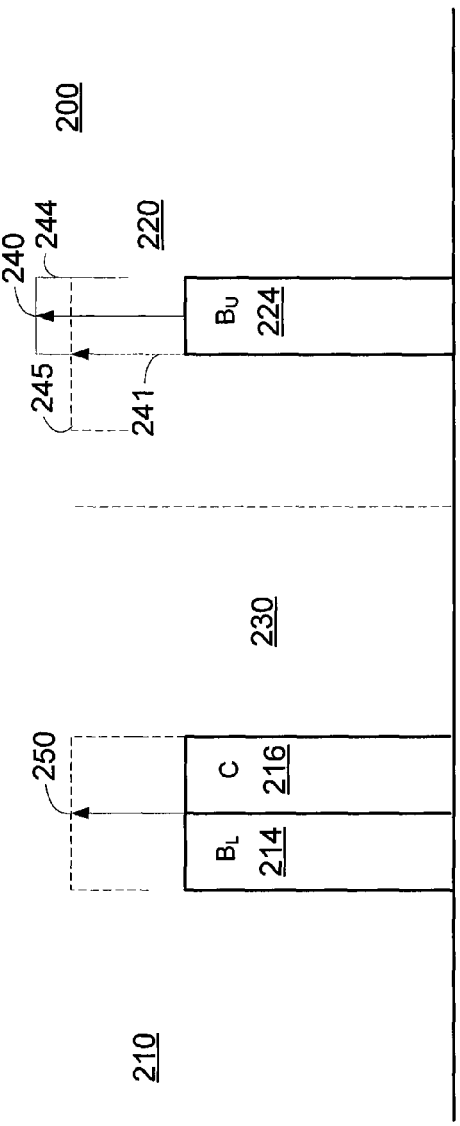

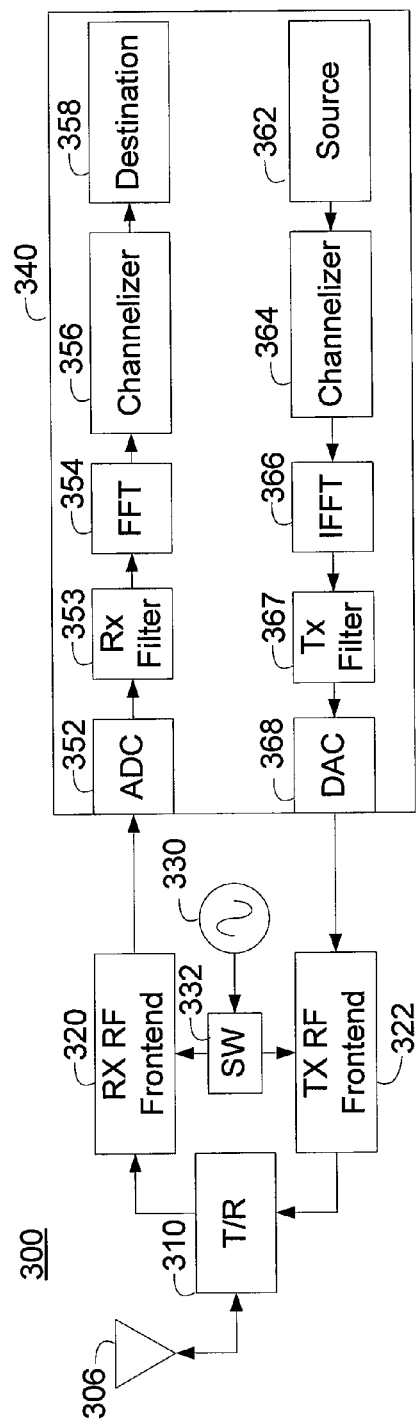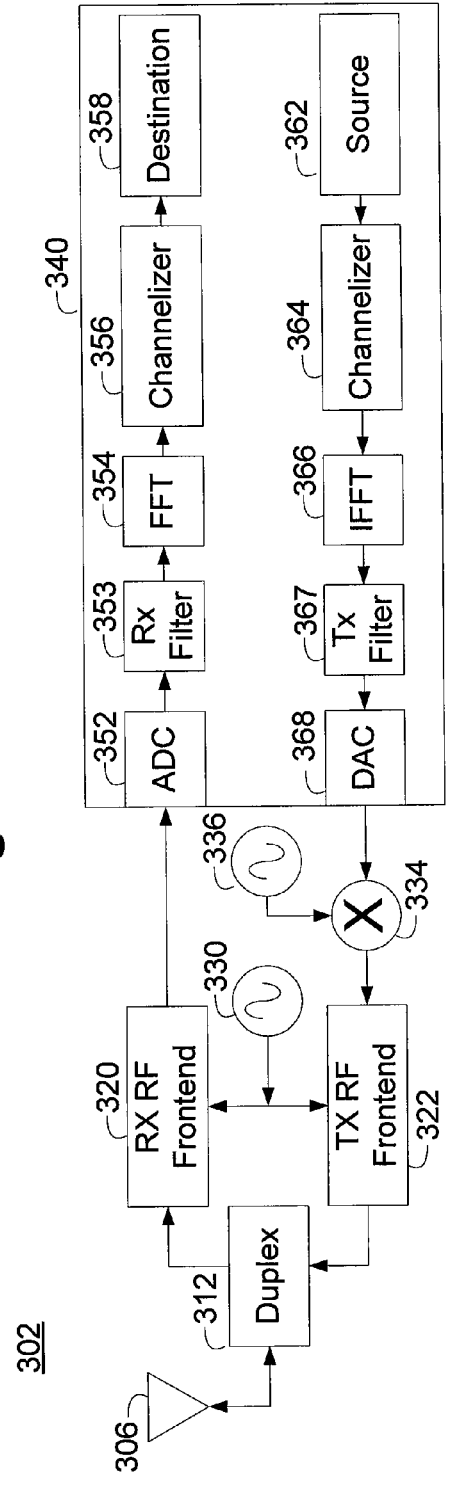
Figure 3A
Figure 3B

US 8,125,974 B2

TRANSMIT EMISSION CONTROL IN A WIRELESS TRANSCEIVER

FIELD OF THE INVENTION

The invention concerns methods, apparatus, and systems for control and reduction of out of band transmit emissions from a wireless transceiver operating in a wireless communication system.

BACKGROUND

Wireless communication systems employ various techniques for supporting two-way communications. For example, a wireless communications system may support Time Division Duplex (TDD) communications, where the same operating frequency band is time multiplexed to support two-way communications. A wireless communication system may support Frequency Division Duplex (FDD) communications, where distinct frequency bands are used for the distinct directions of the duplex communications.

A system designer may take several factors into account when deciding on the manner in which duplex communications is to be supported. In some systems, the manner of duplexing communications is set forth in a standard or specification.

However, the duplexing configuration set forth in a standard may pose design issues for optimizing communications within a given frequency spectrum. For example, a wireless communication standard may specify FDD operation in symmetric transmit and receive bands. However, the actual frequency spectrum that is licensed by a government entity may consist of two bands that may have different bandwidths. The distinct bandwidths of the licensed bands make it difficult to support the symmetric FDD operation specified in the standard.

Additionally, one or more of the licensed bands may border a band that is licensed to support some other type of communications. There may be severe emissions constraints placed on transmitters operating adjacent the band supporting other types of communications. The emissions constraints may require a system designer to implement a large guard band adjacent the other band supporting other types of communications. In such situations, symmetric FDD uplink and downlink bands may be licensed to a system provider, but the effective usable bands may be asymmetric if the large guard band is implemented in one of the licensed bands but not another. Alternatively, the system capacity may be unnecessarily limited if both the licensed uplink and downlink bands implement the guard band, but only one of the uplink or downlink bands is adjacent the band supporting other types of communications.

A system designer may select from any one of several duplexing implementations, but is constrained by spectrum allocation, operating standards, and adjacent band emissions constraints. The combination of design and operational constraints may make it difficult to optimize system capacity across operating bands.

BRIEF SUMMARY

Methods and apparatus for control of undesirable transmit emissions from a wireless transceiver are described herein. A wireless transceiver can be configured to operate in multiple frequency bands using frequency division duplex or hybrid frequency division duplex, where a first operating band is designated for receive signals and a second operating band is designated for transmit signals. The bandwidths spanned by the first band and the second band may be symmetric or asymmetric. Additionally, each of the first band or the second band may be contiguous or may be an aggregate of multiple discontinuous frequency bands.

The wireless transceiver can control undesirable transmit emissions from occurring in a predetermined frequency band by using an offset LO frequency and restricting transmit signals to frequencies away from the predetermined frequency band. Alternatively, in an asymmetric FDD system where a receive band is larger than a transmit band, the transceiver can limit transmit signal allocation to the transmit band. The transceiver can further limit out of band transmit emissions using an offset LO frequency.

Aspects of the invention include a method of transmit emission control in a wireless transceiver. The method includes receiving wireless downlink signals in a downlink frequency band, determining a virtual uplink resource allocation within a virtual uplink frequency band that is distinct from the downlink frequency band and that has substantially a same bandwidth as the downlink frequency band, remapping the virtual uplink resource allocation to an uplink resource allocation in an uplink frequency band that is narrower than the virtual uplink frequency band, and transmitting an uplink signal on the uplink resource allocation.

Aspects of the invention include a method of transmit emission control in a wireless transceiver. The method includes receiving wireless downlink signals in a downlink frequency band, where the downlink frequency band is distinct from an uplink frequency band, determining an uplink resource allocation based on a control message received in the downlink frequency band, the uplink resource allocation restricted to a portion of the uplink frequency band, remapping the uplink resource allocation based on a frequency offset that is based in part on a difference between the uplink bandwidth and the portion of the uplink frequency band over which the uplink resource allocation is restricted, and transmitting an uplink signal over the uplink bandwidth allocation.

Aspects of the invention include a method of transmit emission control in a wireless transceiver. The method includes receiving wireless downlink signals in a downlink frequency band having a first set of subcarriers, determining an uplink resource allocation within an uplink frequency band that is distinct from the downlink frequency band, and wherein the uplink frequency band has a second set of subcarriers distinct from the first set of subcarriers, and wherein the uplink frequency band has a second bandwidth distinct from a first bandwidth of the downlink frequency band, and transmitting an uplink signal in the uplink resource allocation.

Aspects of the invention include a method of transmit emission control in a wireless transceiver. The method includes receiving a downlink Orthogonal Frequency Division Multiplex (OFDM) symbol in a downlink frequency band, and determining an uplink allocation in an uplink OFDM symbol of an uplink frequency band where the uplink frequency band is distinct from the downlink frequency band and where the uplink OFDM symbol includes a number of uplink subcarriers distinct from a number of downlink subcarriers in the downlink OFDM symbol.

Aspects of the invention include a wireless apparatus with transmit emission control. The apparatus includes a receiver configured to receive wireless downlink signals in a downlink frequency band, the wireless signals including a virtual uplink resource allocation, a channel index remapper coupled to the receiver and configured to remap the virtual uplink resource allocation to an uplink resource allocation, a signal mapper configured to map uplink information to a plurality of uplink subcarriers based on the uplink resource allocation, and a transmitter configured to transmit the plurality of uplink subcarriers in an uplink frequency band distinct from the downlink frequency band.

Aspects of the invention include a wireless apparatus with transmit emission control. The apparatus includes a receiver configured to receive in a downlink frequency band a plurality of downlink Orthogonal Frequency Division Multiplex (OFDM) symbols including a virtual uplink resource allocation, and a transmitter configured to transmit a plurality of uplink OFDM symbols based on the virtual uplink resource allocation and in an uplink frequency band distinct from the downlink frequency band, wherein the uplink frequency band has a second bandwidth distinct from a first bandwidth of the downlink frequency band.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 2A-2E are simplified spectrum diagrams.

FIGS. 3A-3C are simplified functional block diagrams of embodiments of transceivers.

DETAILED DESCRIPTION OF EMBODIMENTS OF THE INVENTION

Figure 1:
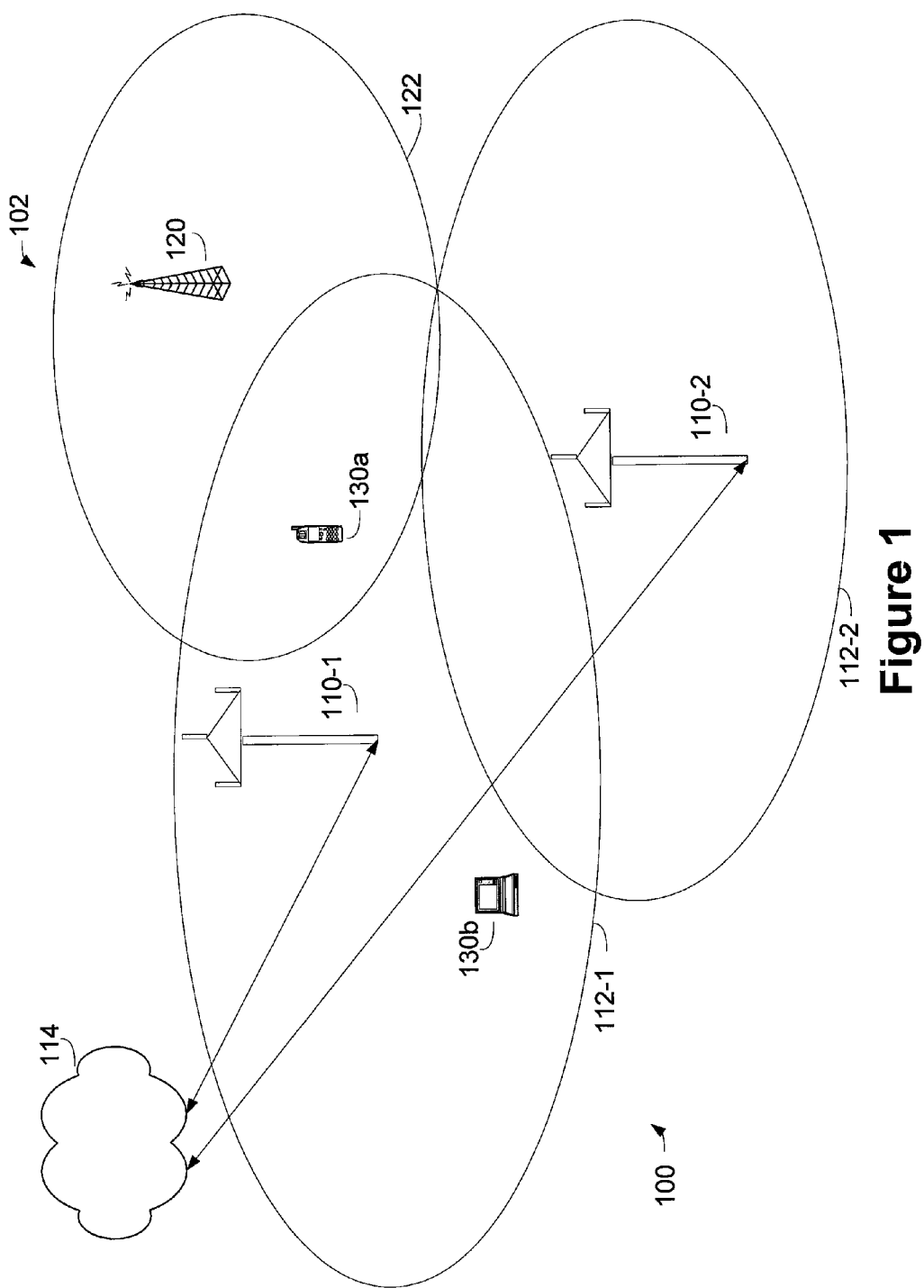
FIG. 1 is a simplified functional block diagram of an embodiment of a wireless communication system in a mixed signal environment.

Methods and apparatus for operating an asymmetric Frequency Division Duplex (FDD) or Hybrid Frequency Division Duplex (H-FDD) communication system are described herein. Additionally, methods and apparatus for controlling transmit emissions in a symmetric or asymmetric FDD or H-FDD communication system are described herein.

As described herein, an H-FDD system is one in which distinct downlink and uplink frequency bands are utilized as in a FDD system. However, in an H-FDD system, the downlink and uplink communications are also Time Division Multiplexed (TDM). In the H-FDD system, a wireless communication device transmits and receives frames in an uplink band that is distinct from a downlink band, where a frame includes a downlink subframe and an uplink subframe.

Although the descriptions provided herein are generally presented in the context of an FDD system, the methods and apparatus are applicable to an H-FDD system.

A wireless system operating in two distinct frequency bands may designate a first frequency band as a downlink frequency band and a second frequency band as an uplink frequency band. A communications standard may specify symmetric downlink and uplink frequency bands or may permit asymmetric downlink and uplink frequency bands. Additionally, one of the downlink or uplink frequency bands may be adjacent to a constrained emissions band. The constraints imposed by the constrained emissions band may greatly affect the ability of a wireless communication system to utilize the entire downlink or uplink band.

The wireless communication system may communicate a greater amount of information in one of the communication directions. For example, a wireless communication system may support broadcast channels in the downlink direction, where a broadcast channel is not directed to any one destination device, but may be accessed from any valid device in a broadcast region. A device receiving a broadcast channel from a base station may have little to send in uplink communications or may even be limited in the ability to send uplink communications.

In a symmetric FDD system, the downlink capacity may be the same as the uplink capacity, but the asymmetric nature of the information communicated on the downlink and uplink may result in the uplink band being lightly loaded, while the downlink band is heavily loaded or otherwise operating near capacity. Typically, the system specification in accordance with certain communication standards, such as IEEE 802.16, may not support asymmetric downlink and uplink bands.

However, the wireless communication system may be configured to support a symmetric FDD standard while operating in an asymmetric band allocation as described herein. An FDD wireless communication system may operate with asymmetric downlink and uplink bands. As an example, the downlink band may be wider than the uplink band.

A wireless communication device may be configured to support virtual symmetric FDD operating bands in one embodiment. In such an embodiment, the wireless communication device supports a virtual band that is substantially symmetric with the wider of the two FDD bands. In the example described above, the wireless communication device supports a virtual uplink band that is substantially symmetric with the downlink band.

The wireless device can receive resource allocation in the virtual uplink band and can remap the resource allocation to the actual uplink band. The actual uplink band can be narrower than the virtual uplink band, and the wireless device can remap the resource allocation based on the difference in bandwidths. The wireless device can then transmit the signal in the actual uplink band effectively supporting the virtual resource allocation.

A resource allocator may be constrained to allocate resources in the virtual uplink band that are supported in the actual uplink band. That is, the resource allocator may be constrained to not allocate any resources in the virtual uplink band that are outside of the actual uplink band.

If the uplink band is positioned in the frequency spectrum adjacent a constrained emissions band, regardless of symmetric or asymmetric downlink and uplink bands, the wireless communication device may offset its Local Oscillator (LO) in a direction away from the constrained emissions band. The wireless communication device may remap its resource allocations to reflect the LO offset. The wireless communication device may reduce its emissions in the constrained emissions band by utilizing a filter that is narrower than would be acceptable in the absence of the LO offset.

The resource allocator may be constrained to allocate uplink resources outside of a guard band that is positioned adjacent to the constrained emissions band. The guard band may be a virtual guard band, as the wireless communication device could receive resource allocations in the virtual guard band and could support communications in the virtual guard band in the absence of the emissions restrictions imposed by operating adjacent to the constrained emissions band.

The methods and apparatus for operating an asymmetric FDD, an asymmetric H-FDD or an H-FDD system and controlling transmit emissions are described herein in the context of an Orthogonal Frequency Division Multiplex (OFDM) transceiver. The transceiver can be configured, for example, to operate in accordance with a predetermined wireless communication standard, such as IEEE 802.16e, Air Interface For Fixed Broadband Wireless Access Systems. For example, the transceiver can be configured to operate in accordance with the Wireless Metropolitan Area Network, Orthogonal Frequency Division Multiple Access physical layer (WirelessMAN OFDMA PHY) defined in the standard.

The methods and apparatus described herein are not limited to application in an IEEE 802.16-complied transceiver, nor are the methods and apparatus limited to application in an OFDM system. The wireless communication system and implementations set forth herein are provided as illustrative examples and are not to be construed as limitations on the application of the methods and apparatus described herein.

FIG. 1 is a simplified functional block diagram of an embodiment of a wireless communication system 100 in a mixed signal environment. The wireless communication system 100 operates in the presence of another wireless communication system 102 operating in a frequency spectrum in which emissions of the wireless communication system 100 are constrained or otherwise limited. In one embodiment, the operating band of the wireless communication system 100 is adjacent the operating band of the wireless system 102, and the coverage areas, 112-1, 112-2, and 122, supported by the respective systems at least partially overlap.

The wireless communication system 100 includes a first base station 110-1 supporting a first corresponding service or coverage area 112-1. The first base station 110-1 can be coupled to a network 114, such as a wired network, and can be configured to allow wireless communication with devices (not shown) in communication with the network 114.

The first base station 110-1 can communicate with wireless devices within its coverage area 112-1. For example, the first base station 110-1 can wirelessly communicate with a first subscriber station 130a and a second subscriber station 130b within the first coverage area 112-1. In another example, the first subscriber station 130a can communicate with a remote device (not shown) via the first base station 110-1. In another example, the first subscriber station 130a can communicate with the second subscriber station 130b via the first base station 110-1.

The first base station 110-1 can be one of a plurality of base stations that are part of the same wireless communication system 100. The base station 110-1 can be in communication with one or more other base stations, for example a second base station 110-2, either through a direct communication link or via an intermediary network. The base stations 110-1 and 110-2 alternatively can be referred to as an access point or node.

The first base station 110-1 can be configured to support an omni-directional coverage area or a sectored coverage area. For example, the first base station 110-1 can support a sectored coverage area 112-1 having three substantially equal sectors. The first base station 110-1 treats each sector as effectively a distinct coverage area. The number of sectors in the coverage area 112-1 is not a limitation on the operation of the methods and apparatus described herein.

A second base station 110-2 supports a corresponding second service or coverage area 112-2. The second base station 110-2 can be configured to be substantially similar to the first base station 110-1.

In one embodiment, each of the base stations, e.g. 110-1 and 110-2, may support two types of access to multicast and broadcast services. The two types of access may be termed single-BS access and multi-BS access. In single BS access, a single base station, e.g. 110-1, implements multicast and broadcast transport connections. In multi-BS access, multiple base stations, e.g. 110-1 and 110-2 transmit time synchronized copies of the data.

An embodiment of multi-BS access described herein is referred to as macro diversity. In this embodiment, each base station, e.g. 110-1 and 110-2, is associated with a macro diversity zone. Each base station, e.g. 110-1 and 110-2, associated with the same macro diversity zone transmits identical multicast and broadcast streams. The macro diversity zone can be identified using a macro diversity identifier that is contained in the broadcast streams. Because the broadcast and multicast streams may not be directed to any particular subscriber station, e.g. 130a or 130b, a single connection identifier (CID) can be used to identify the aggregate broadcast stream.

Different CIDs may be used in different geographical regions for the same broadcast streams. A multicast and broadcast zone identifier can be used to indicate a region through which a particular CID for a broadcast stream is valid. A subscriber station, e.g. 130a, in an idle mode does not have to reconfigure itself to receive the broadcast stream when it moves from the first coverage area 112-1 to a second coverage area 112-2 in the same macro diversity zone. However, if the subscriber station, e.g. 130a, moves, for example, into a different geographic region supported by a different macro diversity zone having a different macro diversity zone identifier, the subscriber station, e.g. 130a, needs to re-establish reception of the new broadcast stream, including upper layer stream parsing, so as to continue receiving the desired broadcast service.

Macro diversity can enhance the reception, at the subscriber station, of the broadcast stream. The base stations 110-1 and 110-2 associated with in the same macro diversity zone are synchronized. In such case, each base station in the same macro diversity zone transmits the same broadcast streams, using the same transmission mechanism (symbol, subchannel, modulation, and etc.) at the same time.

Synchronizing the broadcast streams across multiple base stations 110-1 and 110-2 enables a subscriber station, e.g. 130a, to receive the broadcast transmission from multiple base stations, and thereby improves the reliability of reception.

The subscriber station 130a tuned to a macro diversity broadcast stream need not be registered to any base station, e.g. 110-1. The lack of a registration requirement can allow for a receive only mode of operation when a subscriber station, e.g. 130a, is out of range and cannot "close" the uplink, or in the case where the subscriber station, e.g. 130a, has no transmitting capabilities.

Although only two subscriber stations 130a and 130b are shown in the wireless communication system 100, the system can be configured to support virtually any number of subscriber stations. The subscriber stations 130a and 130b can be mobile stations or stationary stations. The subscriber stations 130a and 130b alternatively can be referred to, for example, as mobile stations, mobile units, or wireless terminals.

A mobile station can be, for example, a wireless handheld device, a vehicle mounted portable device, or a relocatable portable device. A mobile subscriber station can take the form of, for example, a handheld computer, a notebook computer, a wireless telephone, or some other type of mobile device.

In one example, the wireless communication system 100 is configured for OFDM communications substantially in accordance with a standard system specification, such as IEEE 802.16e or some other wireless standard. The wireless communication system 100 can support the methods and apparatus for reducing transmit emissions described herein as an extension to the system standard or fully compliant with the system standard.

Each base station, e.g. 110-1, is configured to transmit data packets to the subscriber stations 130a and 130b organized in frames using one or more slots. The term "downlink" is used to refer to the direction of communication from the base station 110-1 to a subscriber station, e.g. 130a. Each slot can include a predetermined number of OFDMA subcarriers, Orthogonal Frequency Division Multiplex (OFDM) symbols, or a combination of subcarriers and symbols.

Each base station 110-1 or 110-2 can supervise and control the communications within its respective coverage area 112-1 or 112-2. Each active subscriber station, for example 130a, registers with the base station, e.g. 110-1 upon entry into the coverage area 112-1. The subscriber station 130a can notify the base station 110-1 of its presence upon entry into the coverage area 112-1, and the base station 110-1 can interrogate the subscriber station 130a to determine the capabilities of the subscriber station 130a.

In a packet based wireless communication system 100, it may be advantageous for the system to allocate resources as needed, rather than maintaining an active channel assignment for each subscriber station 130a or 130b having an established communication session with the base station 110-1 or 110-2. The base stations 110-1 and 110-2 can allocate resources to the subscriber station 130a on an as needed basis. For example, in an OFDMA system, the base station 110-1 or 110-2 can allocate time and frequency resources to each subscriber station, e.g. 130a, when the subscriber station 130a has information to send to the base station 110-1 or 110-2.

The communication link from the subscriber station 130a to the base station 110-1 or 110-2 is typically referred to as the "uplink." The base station, e.g. 110-1, can allocate uplink resources to the subscriber station 130a to avoid collisions that may occur if the subscriber stations 130a or 130b are allowed random access to the resources. The base station 110-1 can allocate the uplink resources in units of symbols and OFDMA subcarriers.

The wireless communication system 100 can also have the ability to modify or otherwise dynamically select other parameters related to the downlink and uplink communication links. For example, the base stations 110-1 and 110-2 can determine a modulation type and encoding rate from a plurality of modulation types and encoding rates. The base stations 110-1 and 110-2 can be configured to select from a predetermined number of modulation types that can include Quadrature Phase Shift Keying (QPSK) and various dimensions of Quadrature Amplitude Modulation (QAM), such as 16-QAM and 64-QAM.

Each modulation type can have a limited number of available encoding rates. For example, QPSK modulation can be associated with rate ½ or rate ¾ encoding, 16-QAM can be associated with rate ½ or rate ¾ encoding, and 64-QAM can be associated with rate ½, rate ⅔, or rate ¾ encoding. Thus, in this example, the base station 110 can select a modulation type-encoding rate pair from seven possible different types.

The base stations 110-1 and 110-2 can communicate the modulation type-encoder rate pair to a subscriber station 130a or 130b in an overhead message. In one embodiment, the overhead message can be a broadcast message that includes resource allocation information. For example, the overhead message can include the timing, modulation type-encoder rate pair, and slot information allocated to each of the subscriber stations 130a and 130b in the current frame or one or more subsequent frames. The base stations 110-1 and 110-2 can associate particular information with a subscriber station identifier to allow the receiving subscriber stations 130a and 130b to determine which resources are allocated to them.

The base stations 110-1 and 110-2 can transmit the overhead message using a predetermined modulation type and encoder rate, such that the subscriber stations 130a and 130b know, a priori, how to process the overhead message. For example, the base stations 110-1 and 110-2 can transmit the overhead messages using the lowest data rate, that is, QPSK at rate ½.

In one embodiment, the base stations 110-1 and 110-2 are configured to allocate uplink resources to the subscriber station 130a in accordance with the IEEE802.16 standard for OFDMA physical layer communications. The base stations 110-1 and 110-2 send an Uplink-Map (UL-MAP) in each frame, where a frame of information spans a predetermined time.

In one embodiment, each frame time division multiplexes a predetermined downlink time portion (downlink subframe) and a predetermined uplink portion (uplink subframe) in a time division duplex (TDD) fashion. In other embodiments, the uplink and downlink time portions may occur during at least partially overlapping time assignments, but may be separated in frequency in a frequency division duplex (FDD) fashion. In another embodiment, termed H-FDD, the uplink and downlink frequency bands are distinct, as in FDD, and the uplink and downlink transmission times occur in exclusive times.

In a TDD system, the base stations, e.g., 110-1 or 110-2, and subscriber stations, e.g., 130a and 130b, alternate between transmitting and receiving over the same operating frequencies. The downlink and uplink periods are typically mutually exclusive to minimize collisions and interference. In an FDD system, the base stations 110-1 or 110-2 and subscriber stations 130a and 130b transmit and receive signals over distinct uplink and downlink operating frequencies. Uplink transmissions may occur concurrent with downlink transmissions. In an H-FDD system, the base stations 110-1 or 110-2 and subscriber stations 130a and 130b alternate between transmitting and receiving over the distinct uplink and downlink operating frequencies.

Where the wireless communication system 100 is configured to operate in accordance with the IEEE802.16 Wireless-MAN OFDMA PHY, the complete set of OFDMA subcarriers span substantially the entire operating frequency band. The uplink resources assigned to a particular subscriber station, e.g. 130a, may span substantially the entire uplink frequency band or only a portion of the uplink frequency band. As will be described in more detail below, the base stations 110-1 and 110-2 can be configured to operate in a predetermined mode in which the base stations 110-1 and 110-2 allocate uplink resources to subscriber stations 130a and 130b in predetermined portions of the operating frequency band, corresponding to a predetermined subset of OFDMA subcarriers. Selective allocation of uplink resources, and in particular uplink frequencies, permits limiting uplink allocations to a portion of an actual uplink band that overlaps a virtual uplink band. Similarly, selective allocation of uplink resources can substantially contribute to the reduction of out of band emissions.

The wireless communication system 100 can operate in the presence of a wireless system 102 supporting a corresponding coverage area 122 that at least partially overlaps the coverage areas 112-1 and 112-2 supported by the base stations 110-1 and 110-2. The wireless system 102 can operate over an operating frequency band that is substantially adjacent the operating frequency band of the wireless communication system 100. The wireless system 102 may operate in a licensed or otherwise regulated operating frequency band. The regulations or standards applicable to the wireless system 102 may constrain the level of emissions from sources outside the operating frequency band of the wireless system 102. The regulations relating to operating in a given spectrum may limit the level of permissible out of band emissions.

Thus, the level of out of band emissions permitted of the wireless communication system 100 may be constrained by the regulations regarding allowable emissions in the adjacent operating frequency band of the wireless system 102. The wireless communication system 100 may be constrained to a permissible level of out of band emissions for both the downlink and the uplink. The out of band emission constraints can be the same for the downlink and the uplink or can be different.

The base stations 110-1 and 110-2 and the subscriber stations 130a and 130b may have differing abilities to comply with an out of band emission constraint. The size and resources available to the base stations 110-1 and 110-2 may allow for more solutions than are available to a subscriber station, e.g. 130a, that can be a mobile terminal. Thus, the solutions for satisfying a particular out of band emission constraint may be different in the base station, e.g. 110, and the subscriber stations 130a and 130b, even if the downlink and uplink constraints are the same.

Each of the subscriber stations 130a and 130b is aware of its respective downlink and uplink frequency bands. Furthermore, each of the subscriber stations 130a and 130b is aware that it is operating in a symmetric or asymmetric FDD or H-FDD system. In systems that utilize symmetric uplink and downlink bands or in systems that permit asymmetric operation, the subscriber stations 130a and 130b may receive uplink resource allocations directly from the serving base station, e.g. 110-1. However, in systems that have asymmetric uplink and downlink bands, but in which the operating specification only supports uplink resource allocation in symmetric uplink and downlink bands, the subscriber stations 130a and 130b can implement virtual uplink bands that are substantially symmetric with the downlink bands. The subscriber stations 130a and 130b can receive uplink resource allocations indexed to the virtual uplink band and can remap the resource allocation to a resource allocation indexed to an actual uplink band. The base stations 110-1 and 110-2 can be configured to limit the uplink resource allocations to those frequencies that occur in the actual uplink band.

In one embodiment, each of the subscriber stations 130a and 130b can determine its respective operating frequency band. The subscriber stations 130a and 130b can also determine the base station, e.g. 110-1, and corresponding coverage area 112-1 or sector in which they are operating. Each subscriber station 130a and 130b can individually determine whether to institute emission reduction techniques based on the operating frequency, base station 110-1, and corresponding coverage area 112-1 or sector of a coverage area.

For example, the first subscriber station 130a may determine that it is operating within a frequency band within the sector of a coverage area 112-1 of a base station 110-1. The first subscriber station 130a may institute transmit emission reduction based on a portion or a combination of this information. The first subscriber station 130a may selectively institute enhanced transmit emission reduction, because some or all of the emission reduction techniques may result in reduced uplink bandwidth.

Similarly, the second subscriber station 130b may determine, based on the operating frequency, sector of coverage area 112-1, and base station 110-1, that it does not need to initiate enhanced transmit emission reduction techniques. The second subscriber station 130b can continue to operate using default transmit emissions and the default emission reduction techniques.

The first subscriber station 130a limits its uplink bandwidth in the enhanced emission reduction state. The base stations 110-1 and 110-2 operate in a mode that restricts the uplink bandwidth and associated uplink resources that can be allocated to a subscriber station. The base stations 110-1 and 110-2 can be predetermined or otherwise controlled to limit the amount of uplink bandwidth and corresponding portion of the uplink operating band allocated to subscriber stations in the emission reduction state. In embodiments where the base stations 110-1 and 110-2 do not control uplink resource allocation, the subscriber station 130a may be configured to limit its uplink bandwidth and portion of uplink operating band.

For example, the base stations 110-1 and 110-2 operating as an IEEE 802.16 base station can be configured to operate the uplink in an Adaptive Modulation and Coding (AMC) mode. In AMC mode, the base stations 110-1 and 110-2 control an adjacent subcarrier permutation scheme, where adjacent subcarriers are used to form subchannels.

With the AMC permutation scheme, adjacent subcarriers are assigned to a subchannel and the pilot and data subcarriers are assigned fixed positions in the frequency domain within an OFDMA symbol. The AMC permutation can be the same for both uplink and downlink. When AMC permutation is used in a downlink or an uplink subframe, the base stations 110-1 and 110-2 indicate the switch to the AMC permutation zone by using a zone switch Information Element (IE).

In one embodiment of an AMC permutation scheme, a set of nine contiguous subcarriers within an OFDMA symbol is referred to as a "bin." In each bin there is 1 pilot subcarrier and 8 data subcarriers. A bin is a basic allocation unit both in downlink and uplink to form an AMC subchannel.

An AMC subchannel consists of 6 contiguous bins, that may span over multiple OFDMA symbols. An AMC subchannel of type N*M, where N*M=6, refers to an AMC subchannel with N bins by M symbols. The 802.16e OFDMA PHY defines 3 AMC subchannel types, i.e., 1*6, 2*3, and 3*2. All AMC subchannels in an AMC zone have the same type of N*M, which is specified in a Zone Switch Information Element. Depending on the AMC subchannel type (i.e., N*M), an AMC slot can be 1 subchannel by 2, or 3, or 6 OFDMA symbols.

The AMC subcarrier allocation parameters are summarized in Table 1.

TABLE 1

AMC Subcarrier Allocation Parameters

| Parameters | Values | | | |
|---|---|---|---|---|
| FFT size | 128 | 512 | 1024 | 2048 |
| Number of Guard subcarriers | 19 | 79 | 159 | 319 |
| Number of pilot subcarriers | 12 | 48 | 96 | 192 |
| Number of data subcarriers | 96 | 384 | 768 | 1536 |

TABLE 1-continued

AMC Subcarrier Allocation Parameters

| Parameters | Values | | | |
|---|---|---|---|---|
| FFT size | 128 | 512 | 1024 | 2048 |
| Number of bins | 12 | 48 | 96 | 192 |
| Number of subchannels of type 1 * 6 (i.e., over 6 symbols) | 12 | 48 | 96 | 192 |
| Number of subchannels of type 2 * 3 (i.e., over 3 symbols) | 6 | 24 | 48 | 96 |
| Number of subchannels of type 3 * 2 (i.e., over 2 symbols) | 4 | 16 | 32 | 64 |

The base stations 110-1 or 110-2 operating in AMC mode can be configured to limit the number and placement of bins that can be allocated to the first subscriber station 130a. Thus, the base station, e.g., 110-1 or 110-2, limits the available uplink bandwidth and the subcarriers that may be allocated within that bandwidth. The downlink bandwidth, from the base stations 110-1 and 110-2 to the first subscriber station 130a, need not be limited and can span the entire downlink band. The downlink and uplink bandwidths are not required to be symmetrical. If the base stations 110-1 and 110-2 operate with substantially full operating bandwidth in the downlink and limited bandwidth in the uplink bandwidth, the system is asymmetric.

The first subscriber station 130a can limit the baseband bandwidth to a bandwidth that is sufficient to pass the reduced uplink signal. The first subscriber station 130a can vary the bandwidth dynamically, based on the uplink resource allocation received from the base station or a maximum allocatable uplink bandwidth in reduced emission mode. Because the uplink bandwidth is less than the full operating bandwidth in reduced emission mode, the first subscriber station 130a can be configured to set the baseband bandwidth to less than the full operational bandwidth that is available when not operating in reduced emissions mode.

The first subscriber station 130a can also be configured to offset the uplink frequency translation in order to offset a center frequency relative to the band edge nearest the emissions band of interest. Thus, if the emissions band of interest is in a band above the transmit band, the first subscriber station 130a can offset the center frequency of the uplink signal down in frequency and away from the emission band of interest. Alternatively, if the emissions band of interest is below the transmit band, the first subscriber station 130a can offset the center frequency of the transmit signal up in frequency and away from the emission band of interest.

The magnitude of the frequency offset is largely determined by the allocated uplink bandwidth. Again, the first subscriber station 130a can determine the magnitude of the frequency offset dynamically based on the uplink allocation. Alternatively, the first subscriber station 130a can determine the magnitude of the frequency offset based on the maximum allocatable uplink bandwidth in reduced emission mode. The magnitude of the frequency offset is limited by the width of the transmit band. The magnitude of the frequency offset should not exceed the offset that places the edge of the uplink signal at the band edge.

The first subscriber station 130a can further limit the magnitude of the frequency offset based on the uplink resources allocated to it by the base station 110. The base station e.g. 110-1, may allocate particular OFDMA subcarriers, positioned at particular frequencies in the uplink band. The first subscriber station 130a may limit the magnitude of the frequency offset to an offset that allows the first subscriber station 130a to perform subcarrier remapping.

In subcarrier remapping, the first subscriber station 130a remaps the uplink subcarrier indices allocated to it by the base station 110 in order to compensate for the frequency offset introduced local to the subscriber station. By utilizing subcarrier remapping, the frequencies of the subcarriers allocated to the first subscriber station 130a remain consistent with the indexing scheme used by the base stations 110-1 and 110-2, even though the first subscriber station 130a has shifted the center frequency of the uplink signal. With subcarrier remapping, the base station has no knowledge of various techniques utilized by the first subscriber station 130a in supporting asymmetric FDD operation or in reducing the transmit emissions. Therefore, the base stations 110-1 and 110-2 need not perform any additional signal processing, which may require an extension to the system standard, in order to communicate with a subscriber station operating in asymmetric FDD bands or operating in reduced emissions mode.

Figure 2A:
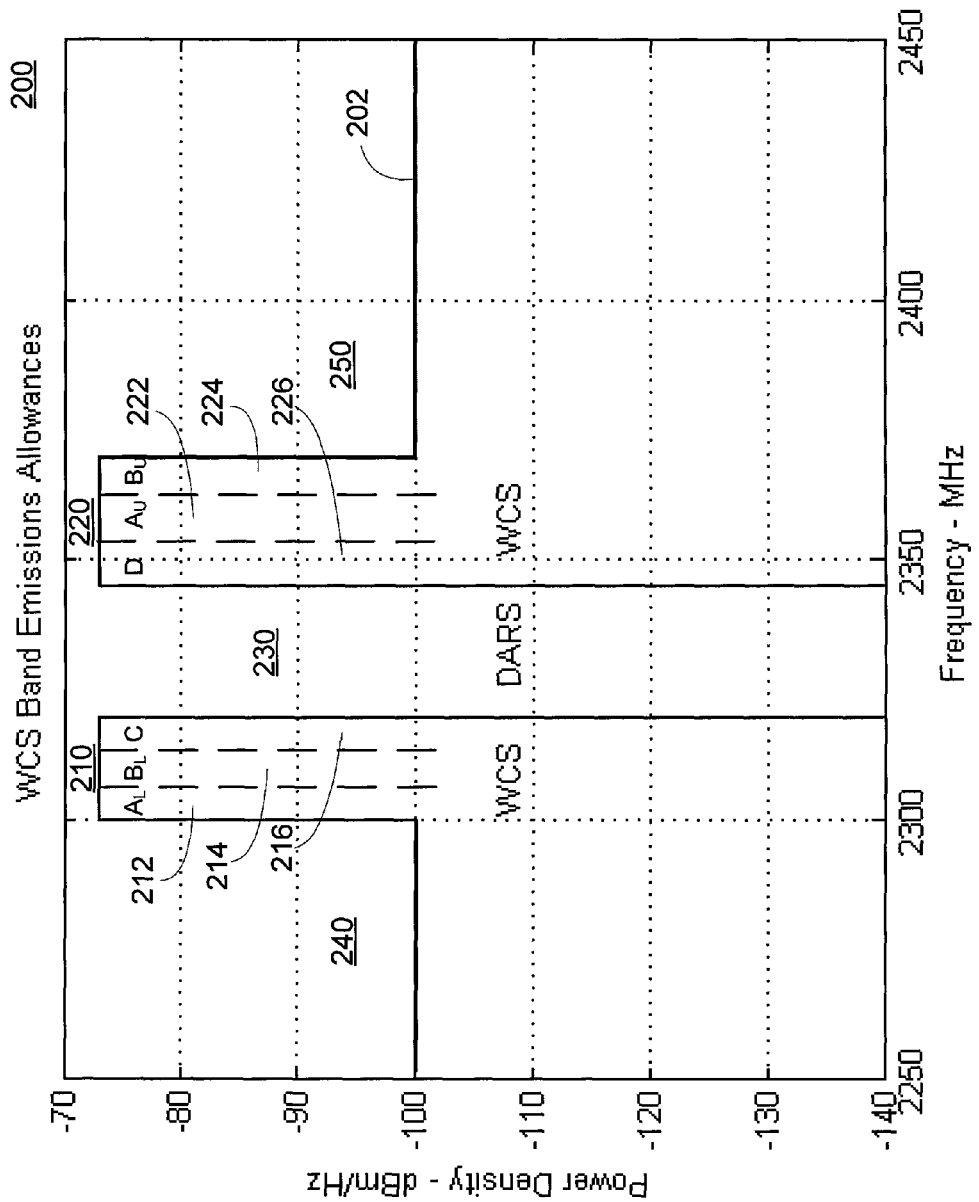

FIG. 2A is a simplified spectrum diagram 200 illustrating an embodiment of a transmit emission mask 202. The horizontal axis denotes frequency, in terms of MHz, and the vertical axis denotes power density, in terms of dBm/Hz. The spectrum diagram 200 illustrates permissible power densities in two distinct Wireless Communication Services (WCS) operating bands, 210 and 220, that are adjacent to a Digital Audio Radio Service (DARS) band 230.

The first and second WCS bands, 210 and 220, span the frequencies from 2305-2320 MHz and 2345-2360 MHz, respectively. In the United States, the first and second WCS bands 210 and 220 include four distinct frequency blocks, designated A-D. The A and B frequency blocks are each paired frequency blocks, while the C and D frequency blocks are unpaired. The A frequency block includes a lower frequency portion 212 and an upper frequency portion 222. The lower frequency portion of the A block 212 spans 2305-2310 MHz, while the upper frequency portion of the A block 222 spans 2350-2355 MHz.

The B frequency block includes a lower frequency portion 214 and an upper frequency portion 224. The lower frequency portion of the B block 214 spans 2310-2315 MHz and the upper frequency portion of the B block 224 spans 2355-2360 MHz.

The C frequency block 216 includes 2315-2320 MHz and the D frequency block 226 includes 2345-2350 MHz. The C frequency block 216 may be licensed separately from the D frequency block 226.

Because the A frequency blocks 212 and 222 as well as the B frequency blocks 214 and 224 are symmetric about the DARS band 230, licensing one or both of the A and B blocks results in symmetric upper and lower bands. Similarly, if both the C band 216 and the D band 226 are licensed, then symmetric upper and lower bands can be maintained.

However, if only one of the C band 216 or D band 226 is licensed in conjunction with the A and B blocks, then the upper and lower frequency bands are asymmetric. For example, if the A and B blocks are licensed with only the C block 216, the upper band has a bandwidth of 10 MHz while the lower band has a bandwidth of 15 MHz. Similarly, if the A and B blocks are licensed with only the D block 216, the upper band has a bandwidth of 15 MHz while the lower band has a bandwidth of 10 MHz.

As an example, the upper band portion can correspond to a downlink frequency band and the lower band portion can correspond to an uplink frequency band in an FDD or H-FDD system. In embodiments where the upper and lower bands are asymmetric, the downlink band may be the band having the greater bandwidth and the uplink band may be the band having the narrower bandwidth. The uplink and downlink band designations are described as continuous and separated by the DARS band 230. However, such a limitation is not a requirement, and the uplink or downlink bands need not be contiguous. Where non-contiguous bands are supported, the system may implement asymmetric FDD or asymmetric H-FDD even when one or both of the paired A or B blocks are licensed or if all A, B, C, and D blocks are licensed.

In the situation where the upper and lower frequency blocks are symmetric or where the operating specification permits asymmetric FDD operation, a subscriber station need not configure a virtual band and need not perform resource allocation remapping. However, if the upper and lower frequency blocks are asymmetric, and the operating specification does not support asymmetric FDD operation, the subscriber station may implement a virtual band combined with resource allocation remapping.

The transmit mask 202 is overlaid the frequency bands. As can be seen, the upper band edge of the first WCS band 210 in the C block 216 and the lower end of the second WCS band 220 in the D block 226 are adjacent to the DARS band 230. The level of signal rejection required at the WCS band edges of interest are nearly 70 dB. The C block 216 in the first WCS band 210 and the D block 226 in the second WCS band 220 are immediately adjacent the DARS band 230 and experience the greatest constraints on out of band emissions due to the proximity to the DARS band 230. The emissions requirement in the band 240 below the first WCS band 210 and in the band 250 above the second WCS band 220 are not as onerous as the emissions constraints in the DARS band 230.

Thus, subscriber stations transmitting in the A or B blocks may not need to institute a reduced emissions mode, while subscriber stations operating in the C or D blocks, 216 and 226 respectively, may be configured to support the reduced emissions mode. Subscriber stations transmitting in the C block 216 of the first WCS band 210 seek to limit out of band emissions above the upper edge of the band, while subscriber stations operating in the D block 226 of the second WCS band 220 seek to limit the out of band emissions below the lower edge of the band.

Thus, the modes of operation may depend on the number and position of the blocks licensed for use by a communication system. The differing combinations of possibilities include symmetric or asymmetric FDD bands with no reduced emission control and symmetric or asymmetric FDD bands with reduced emission control.

For asymmetric FDD bands there is also the possibility of asymmetric FDD band support in the system specification or the lack of asymmetric FDD support in the system specification. Where asymmetric FDD bands are supported in the system specification and the system supports OFDM communications, the system specification may permit an equal number of uplink and downlink subcarriers or a distinct number of uplink and downlink subcarriers.

Figure 2B:
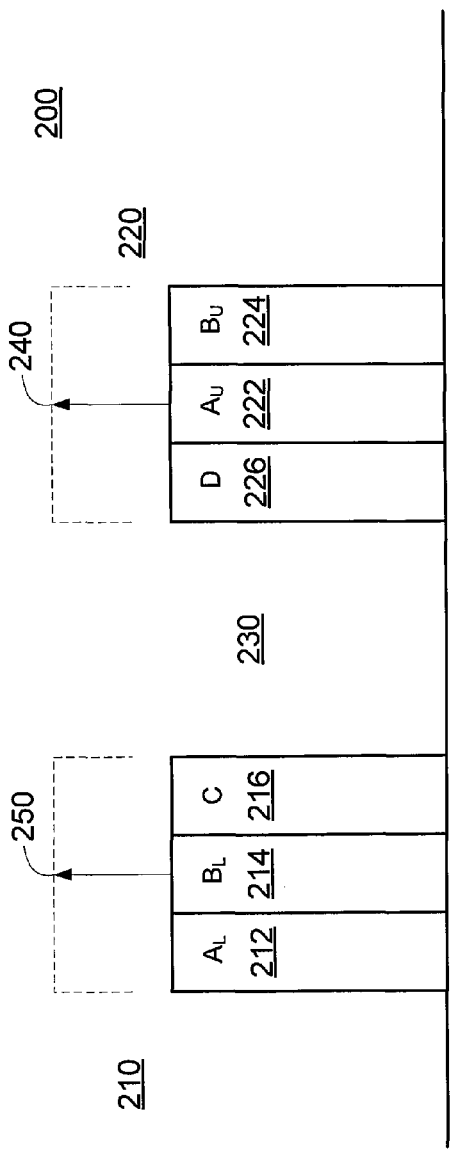

FIGS. 2B-2E are simplified spectrum diagrams of examples of possible band allocations. FIG. 2B illustrates a simplified spectrum diagram in which the A, B, C, and D bands are licensed. The licensed spectrum in the first WCS band 210 has the same 15 MHz bandwidth as the licensed spectrum in the second WCS band 220. A wireless system can configure, for example, the first WCS band 210 as a downlink band and the second WCS band 220 as the uplink band. The subscriber station can position its local oscillator (LO) frequencies in substantially the center of each band. Thus, the downlink LO 250 can be positioned at substantially the center of the downlink band and the uplink LO 240 can be positioned at substantially the center of the uplink band. The wireless system can support symmetric FDD or H-FDD communications because the downlink and uplink frequency bands have the same bandwidth.

Figure 2C:
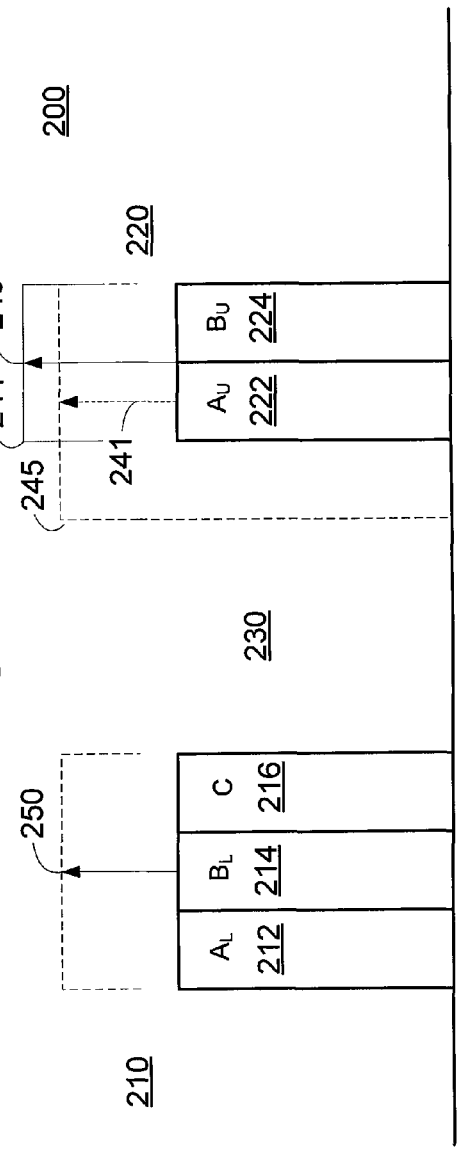

FIG. 2C is a simplified spectrum diagram in which only the A, B, and C bands are licensed. The wireless communication system can configure, for example, the wider band for downlink communications and can configure the narrower band for uplink communications. In the spectrum of FIG. 2C, the lower A and B bands, 212 and 214, along with the C band 216 can be configured to support downlink communications, while the upper A and B bands, 222 and 224, can be configured to support uplink communications. The wireless system can support asymmetric FDD or H-FDD communications because the downlink and uplink frequency bands have different bandwidths.

The subscriber station can be configured to position the downlink LO 250 in substantially the center of the downlink band. The subscriber station can configure an uplink LO 240 at substantially a center of the actual uplink band 244. However, the uplink resources allocated to the subscriber station may be referenced to a virtual bandwidth 245. The virtual band 245 represents the spectrum that would have been available for uplink communications had the D band 226 also been licensed. The virtual band 245 has a bandwidth that is the same as the downlink bandwidth.

The use of the virtual band 245 permits a wireless communication system to support asymmetric FDD or H-FDD even where the communication standard does not expressly support asymmetric uplink and downlink frequency bands. The ability to support asymmetric FDD bands may be advantageous in wireless communication systems that span a geographic region where symmetric bands are licensed for part of the geographic region and asymmetric bands are licensed for other parts of the geographic region. In the example illustrated in FIG. 2C, the upper WCS band includes the upper A and B bands, 222 and 224, as well as the D band 226. The D band 226 may be licensed for portions of the geographic regions in the wireless communication system but may not be licensed for other portions of the geographic regions in the wireless communication system.

The system can rely on the virtual bands to support asymmetric FDD communications to minimize the expense and effort of designing and configuring specialized base station equipment, which may not conform to an operating standard, in the geographic regions not having symmetric uplink and downlink bands. By utilizing a virtual band, typically configured as a virtual uplink frequency band, a base station always appears to operate over symmetric uplink and downlink bands. The allocation of uplink resources can be constrained through techniques that are provided for in the operating standard. For example, an 802.16 base station may restrict its uplink resource allocations based on AMC zones in order to eliminate the possibility of the base station allocating resources within a virtual band but outside of an actual band.

The base station can allocate uplink resources to the subscriber station relative to the virtual band 245 and the subscriber station can remap the resource allocations to the actual uplink frequency band 244. For example, a wireless communication system may support 1024 subcarriers in each of symmetric downlink and uplink frequency bands. The subcarriers may be identified by an index ranging from 0 through 1023, with the subcarrier having an index of 0 being the lowest frequency subcarrier in the band. The base station may allocate uplink resources to the subscriber station by communicating to the subscriber station the indices of the allocated subcarriers and times for which the subcarriers are allocated.

The base station utilizes a subcarrier indexing that is relative to the virtual band 245. The subcarrier indexing in the base station resource allocation may be the same or different from the subcarrier indexing implemented within the subscriber station depending on the placement of the subscriber station uplink LO 240.

The subscriber station may determine a nominal LO 241 which represents the LO frequency used by the subscriber station if supporting the virtual band 245. The subscriber station may then compare the frequencies of the nominal LO 241 against the uplink LO 240 to determine if the subcarrier indices in the resource allocation need to be remapped. If the frequency of the nominal LO 241 is the same as the frequency of the uplink LO 240, the subscriber station does not need to perform any subcarrier remapping, and the subcarrier indexing used by the base station is identical to the subcarrier indexing used by the subscriber station in the actual uplink frequency band 244.

However, it may be advantageous for the subcarrier to have a different frequency for the uplink LO 240 than the nominal LO 241 frequency. If the subscriber station positions the uplink LO 240 at substantially the center of the actual uplink frequency band 244, the subscriber station may use narrower baseband and RF filters than if the nominal LO 241 frequency is used. Using a narrower baseband filter, RF filter, or combination thereof enables the subscriber station to further reduce out of band transmit emissions.

In the example shown in FIG. 2C, the subscriber station can implement an uplink LO 240 at substantially the center of the uplink frequency band 244. The subscriber station can remap the subcarrier indices in the resource allocations from the base station to the subcarrier indexing in the subscriber station. The subcarrier indexing can be remapped, for example, based on the frequency difference between the nominal LO 241 and the uplink LO 240 and the subcarrier spacing.

FIG. 2D is a simplified spectrum diagram in which only the A and D bands are licensed. The A band is licensed as a pair of bands, $A_U$ and $A_L$, 222 and 212 respectively. The wireless communication system can implement downlink communications in the D band 226 and upper A band 222. The wireless communication system can implement uplink communications over the lower A band 212.

The subscriber station can implement a downlink LO 250 substantially at the center of the combination of the $A_U$ and D bands, 222 and 226. The base station can allocate uplink resources to the subscriber station indexed to a virtual band 245 and a nominal LO 241 in the center of the virtual band 245. The subscriber station can position the actual uplink LO 240 at substantially the center of the uplink band 244, here the lower A band 212. The subscriber station can remap the uplink resource allocations to compensate for the difference in the frequencies of the uplink LO 240 and nominal LO 241.

FIG. 2E is a simplified spectrum diagram in which only the B and C bands are licensed. The B band is licensed as a pair of bands, $B_U$ and $B_L$, 224 and 214 respectively. The wireless communication system can implement downlink communications in the C band 216 and lower B band 214. The wireless communication system can implement uplink communications over the upper B band 224.

The subscriber station can implement a downlink LO 250 substantially at the center of the combination of the $B_L$ and C bands, 214 and 216. The base station can allocate uplink resources to the subscriber station indexed to a virtual band 245 and a nominal LO 241 in the center of the virtual band 245. The subscriber station can position the actual uplink LO 240 at substantially the center of the uplink band 244, here the upper B band 224. The subscriber station can remap the uplink resource allocations to compensate for the difference in the frequencies of the uplink LO 240 and nominal LO 241.

Figure 3C:
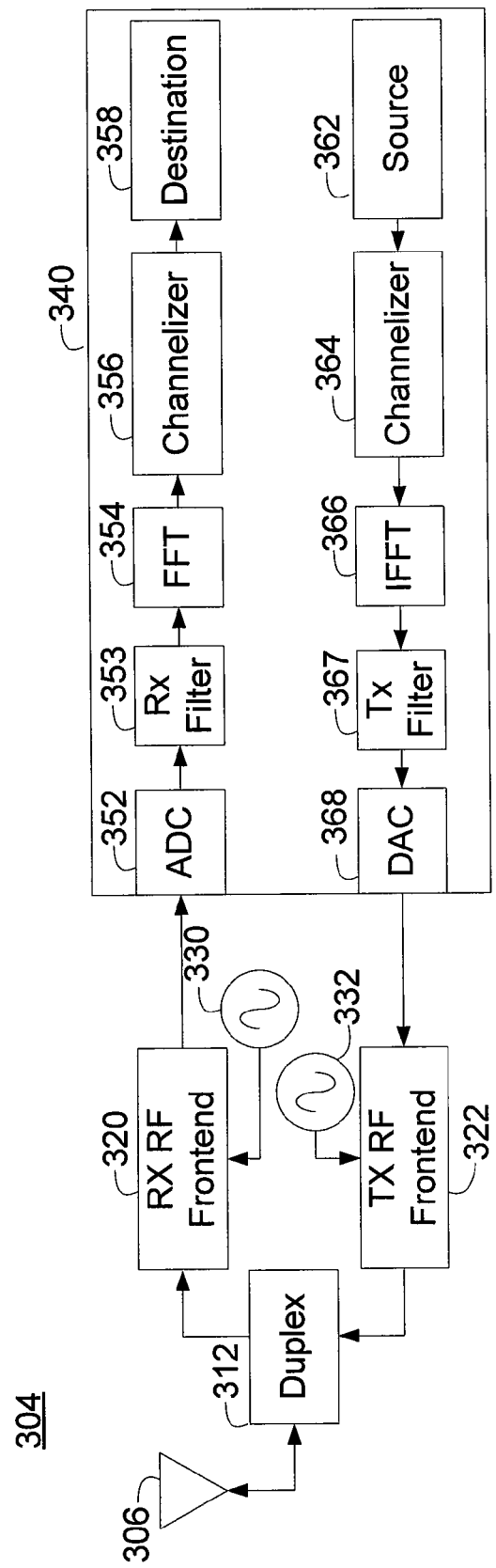

FIGS. 3A through 3C are simplified functional block diagrams of embodiments of transceivers 300, 302, and 304 configured to support FDD operation. The first transceiver embodiment 300 can be configured to support H-FDD operation, while the second and third transceiver embodiments 302 and 304 can be configured to support full duplex FDD as well as H-FDD operations. Each of the transceiver embodiments 300, 302, and 304 can be, for example, a transceiver in a subscriber station of the system of FIG. 1 configured to operate in the spectrum of FIG. 2.

Each transceiver embodiment 300, 302, and 304 includes an antenna 306 coupled to receive and transmit front end modules, 320 and 322 respectively, that are coupled to a baseband processor 340. In one embodiment, compared with the first transceiver 300, the second transceiver 302 additionally includes a mixer 334 and Local Oscillator (LO) 336 to introduce the transmit/receive frequency offset.

As shown in FIG. 3A, the first transceiver 300 includes an antenna 306 through which the uplink and downlink signals are communicated. The antenna 306 couples the downlink signals to a transmit/receive (T/R) switch 310. The T/R switch 310 operates to couple the downlink signals to the receiver portion of the transceiver 300 during a downlink subframe and operates to couple uplink signals from the transmitter portion of the transceiver 300 during an uplink subframe.

During the downlink portion or subframe, the T/R switch 310 couples the downlink signals to a receive RF front end 320. The receive RF front end 320 can be configured, for example, to amplify, frequency convert a desired signal to a baseband signal, and filter the signal. The baseband signal is coupled to a receive input of a baseband processor 340.

The receive input of the baseband processor 340 couples the received baseband signal to an Analog to Digital Converter (ADC) 352 that converts the analog signal to a digital representation. The output of the ADC 352 can be coupled to a transformation module, such as Fast Fourier Transform (FFT) engine 354 that operates to convert the received time domain samples of an OFDM symbol to a corresponding frequency domain representation. The sample period and integration time of the FFT engine 354 can be configured, for example, based upon the downlink frequency bandwidth, symbol rate, subcarrier spacing, as well as the number of subcarriers distributed across the downlink band, or some other parameter or combination of parameters.

The output of the FFT engine 354 can be coupled to a channelizer 356 that can be configured to extract the subcarriers from those symbols that are allocated to the particular transceiver 300. The output of the channelizer 356 can be coupled to a destination module 358. The destination module 358 represents an internal destination or output port to which received data may be routed.

The uplink path is complementary to the downlink signal path. A source module 362 of the base band processor 340, which may represent an internal data source or an input port, generates or otherwise couples uplink data to the baseband processor 340. The source 362 couples the uplink data to an uplink channelizer 364 that operates to couple the uplink data to appropriate uplink resources that are allocated to support the uplink transmission.

The output of the uplink channelizer 364 is coupled to an IFFT engine 366 that operates to transform the received frequency domain subcarriers to a corresponding time domain OFDM symbol. The uplink IFFT engine 366 may support the same bandwidth and number of subcarriers as supported by the downlink FFT engine 356. Alternatively, the uplink and downlink may support distinct numbers and spacing of subcarriers. For example, the uplink and downlink bandwidth may be substantially the same, but the uplink IFFT engine 366 may implement a 2048-point IFFT, while the downlink FFT engine 354 may implement a 1024-point FFT. In another example, the FFT engine 354 and IFFT engine 366 may both implement the same size transform, but the uplink bandwidth may be distinct from the downlink bandwidth, resulting in distinct uplink and downlink subcarrier spacing.

In asymmetric FDD configurations supported by a corresponding system specification, the uplink FFT engine 366 may support a number of subcarriers that span an uplink bandwidth that is distinct from the downlink bandwidth that may comprise a distinct number of subcarriers. Typically, in asymmetric FDD configurations that emulate a symmetric FDD configuration, the number of subcarriers and bandwidth of a virtual uplink bandwidth can be equal to the number of subcarriers and bandwidth of the downlink bandwidth, while the number of subcarriers in the actual uplink band can be a subset of the number of downlink subcarriers. However, the subcarrier frequency spacing in the uplink can be the same as the subcarrier frequency spacing in the downlink.

The output of the uplink FFT engine 366 is coupled to a Digital to Analog Converter (DAC) 368 that converts the digital signal to an analog representation. The analog baseband signal is coupled to a transmit front end 322, where the signal is frequency translated to the desired frequency in the uplink band. The output of the transmit front end 322 is coupled to the T/R switch 310 that operates to couple the uplink signal to the antenna 306 during the uplink subframe.

An LO 330 is coupled to a switch 332 or demultiplexer that selectively couples the LO 330 to one of the receive front end 322 or transmit front end 322 so as to be synchronized to the state of the T/R switch 310. The frequency of the LO 330 can be retuned to reflect the different downlink and uplink bands. Additionally, the frequency of the LO 330 can be tuned to reflect an LO offset frequency that can be based on a guard band offset used to reduce transmit emissions, a virtual uplink band offset, or a combination of the two.

One embodiment of the second transceiver 302 is configured similar to the above-descried embodiment of first transceiver 300. As seen in FIG. 3B, the second transceiver additionally includes a mixer 334 that couples the output of the baseband processor 340 to the transmit front end 322. The mixer 334 is driven by an offset LO 336. The inclusion of the offset LO 336 permits full duplex operation. The frequency of the offset LO 336 can be based on a guard band offset used to reduce transmit emissions, a virtual uplink band offset, or a combination of the two.

In the second transceiver 302, as shown in FIG. 3B, the LO 330 can operate to drive the receive front end 320 and transmit front end 322 concurrently. A duplexer 312 is configured to concurrently couple the antenna 304 to the receive front end 320 and the transmit front end 322. The duplexer 312 operates to isolate the receive front end 320 from the transmit front end 322 to permit concurrent operation.

The third transceiver 304 embodiment is configured similar to the second transceiver 302 embodiment. The third transceiver 304 permits full duplex operation by implementing independent downlink LO 330 and uplink LO 332 instead of utilizing an offset LO. The interface to the duplexer 312 and baseband processor 340 are otherwise the same as in the first and second transceiver embodiments, 300 and 302, respectively.

Figure 4:
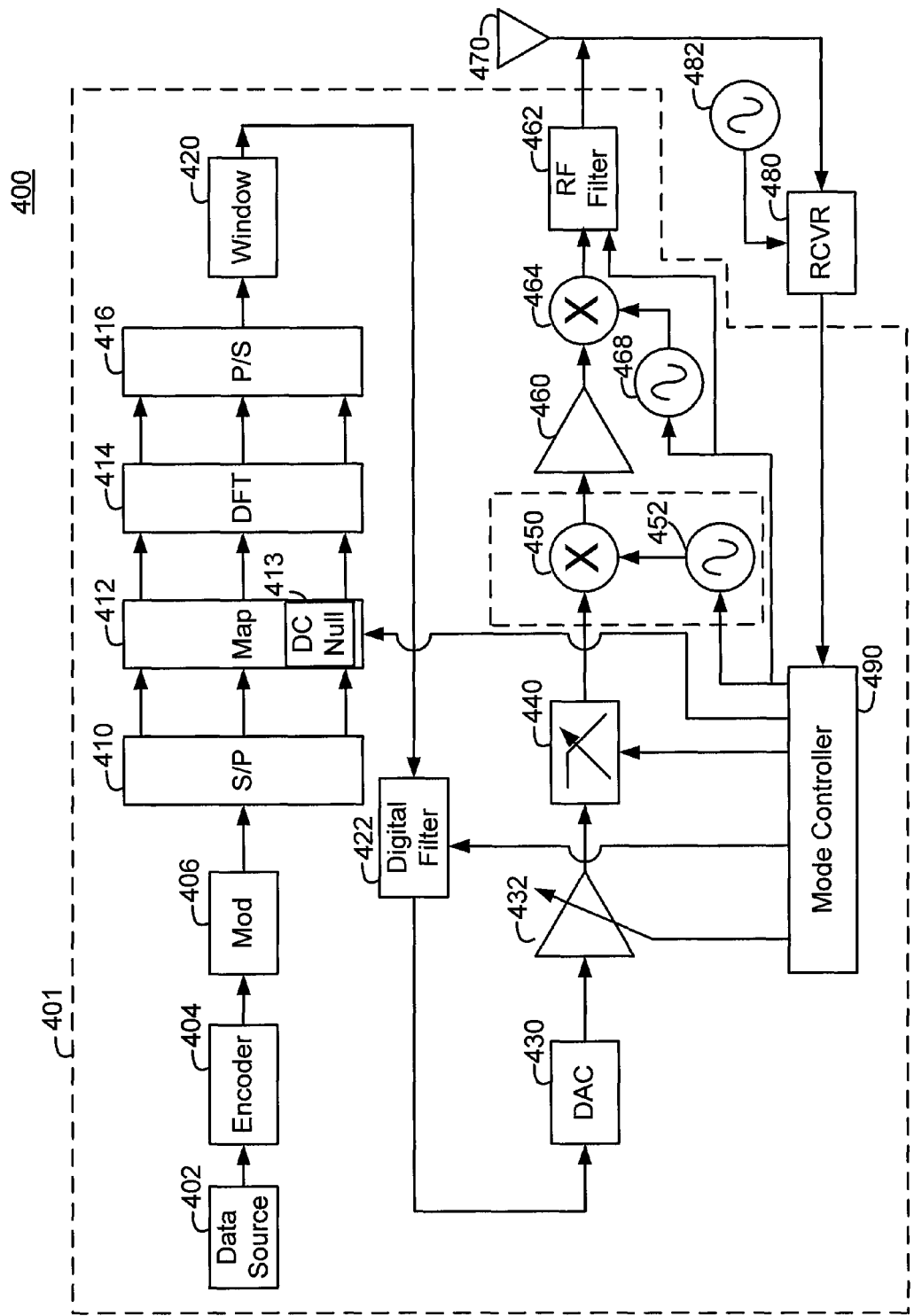
FIG. 4 is a simplified functional block diagram of an embodiment of a transceiver.

FIG. 4 is a simplified function block diagram of an embodiment of a transceiver 400. The transceiver 400 can be configured to emulate symmetric FDD bands when supporting asymmetric FDD bands. The transceiver 400 can also be configured or selectively controlled to operate in a reduced emission mode.

The transceiver 400 can be implemented in the wireless communication system of FIG. 1, and more specifically, in a base station or one or more subscriber stations illustrated in FIG. 1. The transceiver 400 described below is described in the context of a subscriber station operating in an IEEE802.16-complied wireless communication system, but the described techniques for emulating symmetric FDD operation and reducing out of band emissions are not limited to application in a subscriber station nor are they limited to application in an IEEE802.16-complied wireless communication system.

The transceiver 400 includes a transmitter portion 401 and a receiver 480 coupled to an antenna 470. In an embodiment, the transmitter portion 401 and the receiver 480 operate in a Frequency Division Duplex (FDD) manner, in which the transmitter portion 401 and the receiver 480 use distinct frequency bands. Or in an alternative embodiment, the transmitter portion 401 and the receiver 480 operate in a Hybrid-FDD (H-FDD) manner, in which the transmitter portion 401 and the receiver 480 use distinct frequency bands and a transmit period occurs in a time period distinct from a receive period.

Although FIG. 4 depicts each data stream in transceiver 400 with a single communication path, some of the communication paths may represent complex data, and a signal path for complex data may be implemented using a plurality of communication paths. For example, a complex communication path can include a first communication line to communicate the real part or in-phase component of the complex data and a second complex communication line to communicate the imaginary part or quadrature component of the complex data. Similarly, in a polar representation of complex data, a first communication line can be used to communicate a magnitude of the complex data and a second communication line can be used to communicate a corresponding phase of the complex data.

The transmitter portion 401 includes a data source 402 that is configured to generate or receive data or information that is to be transmitted to a destination at or via a base station. The data source 402 can generate data internal to a subscriber station such as internal performance metrics. Alternatively, the data source 402 can be configured to accept data or other information from a an external source, via an input port or some other data interface.

In the embodiment of FIG. 4, the data output from the data source 402 is a stream of data in digital format. The data source 402 can be configured to receive or otherwise generate the digital data format. In embodiments where the data source 402 receives one or more analog signals, the data source 402 can include an Analog to Digital Converter (ADC) (not shown) to convert the signals to a digital format.

The output of the data source 402 is coupled to an encoder 404 that can be configured to encode the uplink data according to a specified encoding rate and type. For example, a base station can allocate uplink resources to the transceiver 400 and can specify a type of encoding and corresponding encoding rate from a set of encoding rates and types. In other embodiments, the encoder 404 is configured to perform a predetermined encoding function.

The encoder 404 can be configured to perform, for example, block interleaving, block coding, convolutional coding, turbo coding, and the like, or some combination of coding types. Additionally, for each coding type, the encoder 404 may have the ability to encode the data at any one of a plurality of encoding rates.

The output of the encoder 404 is coupled to a modulator 406 that can be configured to modulate the encoded data according to one of a plurality of modulation types. As described above, the base station can specify a modulation type in addition to specifying the encoding rate. The modulation type can be selected from the list including QPSK, QAM, 16-QAM, 64-QAM, and the like, or some other modulation type. In other embodiments, the modulator 406 is configured to modulate the encoded data according to a fixed modulation type.

The output of the modulator 406 is coupled to a serial to parallel converter 410. In one embodiment, the serial to parallel converter 410 can be controlled to generate a number of parallel paths determined partially by the number of available subcarriers of an OFDM system that can be used to carry information.

The output of the serial to parallel converter 410 is coupled to a signal mapper 412. The signal mapper 412 is configured to selectively map the parallel signals to the subcarriers allocated to the transceiver 400 by the base station. The signal mapper 412 can be configured to map the parallel signals or data to any one of a plurality of subcarrier sets. For example, the transceiver 400 can be selectively controlled to support generation of an OFDM symbol having up to 128, 512, 1024, 2048, or some other selectable number of subcarriers.

The transceiver 400 receives the dimension of the subcarriers in a control message and can configure the signal mapper 412 to map the data to the subcarriers allocated by the base station. The signal mapper 412 can be configured to determine the subcarrier mapping based on various factors such as control signals, messages, or levels provided by a mode controller 490. In some embodiments, the functions of the encoder 404, serial to parallel converter 410, and signal mapper 412 can be combined in the signal mapper 412, and a distinct encoder 404 and serial to parallel converter 410 can be omitted.

The signal mapper 412 can also include a DC null module 413 or otherwise be configured to null a particular subcarrier within the OFDM symbol. The position of the subcarrier corresponding to the DC subcarrier can be determined, based in part on one or more control signals, and can depend at least in part on a subcarrier remapping that occurs as a result of a frequency offset introduced into a LO frequency. The DC null module 413 can be configured, for example, to null, omit, or otherwise attenuate any symbols, bits, or sample values that would otherwise map to or modulate a DC subcarrier.

The DC null module 413 may operate to null or otherwise disable a subcarrier in the virtual band index that maps to the DC subcarrier in the uplink frequency band. The effect of this DC null operation may be that some uplink information is deleted and not transmitted in the uplink resource allocation. However, because the encoder 404 may implement forward error correction and block interleaving, the information omitted from the uplink transmission may be successfully recovered at the destination despite its removal by the DC null module 413.

The DC null module 413 is illustrated as implemented within the signal mapper 412. However, other embodiments can introduce the DC null module 413 within some other position in the signal path. For example, the DC null module 413 may be implemented within a subsequent DFT (Discrete Fourier Transform) transform module 414, in an RF signal path, in some other signal processing module, or in a combination of signal processing modules.

The output of the signal mapper 412 is coupled to the transform module 414. The transform module 414 can be configured to generate an OFDM symbol based on the parallel inputs. The transform module 414 can be configured, for example, to perform a Discrete Fourier Transform (DFT), Fast Fourier Transform (FFT), Inverse Fast Fourier Transform (IFFT) and the like, or some other transform configured to generate the desired symbol.

The output of the transform module 414 is coupled to a parallel to serial converter 416 that is configured to generate a serial data stream from the parallel output of the transform module 414. The serial signal stream from the parallel to serial converter 416 is coupled to a windowing module 420 that is configured to perform windowing or filtering of the serial signal stream. The windowing module 420 can implement a window response that is controllable. In one embodiment, the windowing module 420 can be configured as a digital filter having a programmable bandwidth and response. The output of the windowing module is coupled to a digital filter 422, whose bandwidth may be programmable. The bandwidth of the digital filter can be dynamically scaled based on the transmit data bandwidth or spatial bandwidth. For example, the digital filter 422 can be configured as a low pass filter, and the bandwidth of the filter may be determined based on the transmit data bandwidth or the uplink subcarrier allocation.

The output of the digital filter 422 is coupled to a Digital to Analog Converter (DAC) 430. The DAC 430 converts the digital signal stream to an analog signal stream. The analog output from the DAC 430 is coupled to a variable gain amplifier (VGA) 432. The gain of the VGA 432 can be controlled by the mode controller 490 that can include a portion that operates on a feedback power control signal.

The output of the VGA 432 is coupled to a variable filter 440. The bandwidth of the variable filter 440 is controlled by the mode controller 490, and is controlled to reduce transmit emissions when the transceiver 400 operates in reduced emissions mode. The variable filter 440 is typically implemented as a low pass filter that operates on a baseband signal output from the VGA 432. However, the actual configuration of the variable filter 440 can be based on the spectrum of the signal from the VGA 432. In some embodiments, the variable filter 440 can be implemented as a band pass filter (BPF) or complex LPF or complex BPF.

The filtered output from the variable filter 440 is coupled to an optional intermediate frequency conversion stage. The optional intermediate frequency conversion stage includes a frequency converter, shown as a first mixer 450 in the embodiment of FIG. 4. The frequency converter is not limited to a mixer 450, but can be some other type of frequency converter, such as a multiplier, upsampler, modulator, and the like, or some other manner of frequency conversion.

In the embodiment shown in FIG. 4, the output of the variable filter 440 is coupled to an Intermediate Frequency (IF) port of the first mixer 450. A signal from a controllable Local Oscillator (LO) 452 drives a LO port of the first mixer 450. The signal is frequency converted to an Intermediate Frequency (IF) band or a Radio Frequency (RF) band. The mixer 450 can be configured to generate a Single Side Band (SSB) version of the input signal. The mixer 450 can be configured to output an upper side band or a lower side band signal.

In an alternative embodiment, the first mixer 450 is configured to directly modulate a complex signal from the variable filter 440 onto the output signal from the LO 452. The resulted output from the first mixer 450 is a frequency converted version of the complex signal with a center frequency approximately equal to the frequency of the LO 452. In such an embodiment, the first mixer 450 can include an in-phase mixer configured to frequency convert an in-phase (I) signal component and a quadrature mixer configured to frequency convert a quadrature (Q) signal component. The output of the in-phase and quadrature mixers are combined, for example using a signal summer.

The first mixer 450 can also include a splitter configured to split or otherwise divide the LO signal into two signals. The first mixer 450 can include a phase shifter to phase shift a first of the LO signals by substantially 90 degrees relative to the second of the LO signal. The first and second LO signals are coupled to the LO input of the in-phase and quadrature mixers, respectively.

The phases of the LO signals and the phases of the complex signal components may correspond or may be complementary. That is, the quadrature signal component may be upconverted using either the quadrature LO signal or the in-phase LO signal. The in-phase signal component is then upconverted with the LO signal that is not used for the quadrature signal component.

The mode controller 490 controls the frequency of the LO 452. As will be discussed in further detail below, the frequency of the LO 452 can be offset from a default frequency based on whether the transceiver 400 emulates symmetric FDD operation or whether the transceiver 400 is configured to operate in the reduced emissions mode.

The upconverted signal from the mixer 450 is coupled to a power amplifier 460 that is configured to amplify the transmit signal to the desired output power. The power amplifier 460 can be configured with a fixed gain or with a variable gain. The output of the power amplifier 460 is coupled to a second mixer 464 that operates to frequency translate the signal to the desired output frequency.

An RF LO 468 used to drive the second mixer 464 to upconvert the uplink signals. The RF LO 468 can be, for example, a fixed frequency LO or a variable frequency LO. The output of the second mixer 464 is coupled to an RF filter 462 that operates to minimize undesired products that may be generated by the second mixer 464 or power amplifier 460. The bandwidth of the RF filter 462 can be fixed or can be variable.

In one embodiment, the bandwidth of the RF filter 462 is fixed to a bandwidth that is less than a bandwidth of a transmit operating band. For example, the bandwidth of the RF filter 462 can be fixed to approximately ¼, ⅓, ½, ⅔, ¾ or some other fraction of the bandwidth of the uplink frequency band. In another embodiment, the bandwidth of the RF filter 462 is controlled by the mode controller 490. The filtered output is coupled to the antenna 470 for transmission to a base station or other destination.

In an alternative embodiment, the intermediate frequency conversion stage can be omitted, and the output from the variable filter 440 is coupled to the input of the power amplifier 460. The output of the power amplifier 460 is coupled to the second mixer 464 that operates in conjunction with the RF LO 468 to frequency translate the signal to the desired output frequency. When the intermediate frequency conversion stage is omitted, the second mixer 464 in conjunction with the RF LO 468 operate to direct convert the uplink signal to the desired operating frequency. The position of the power amplifier 460 and second mixer 464 may also be reversed to minimize losses from the power amplifier 460 to the antenna 470.

In yet another embodiment, the intermediate frequency conversion stage operates to direct convert the uplink signals to the uplink operating frequency. In this embodiment, the second mixer 464 and RF LO 468 may be omitted.

The downlink signals from the antenna 470 are coupled to the receiver 480. The receiver 480 uses a downlink LO 482 to frequency convert the received signals to baseband signals. The received signals, and in particular, received mode control signals can be coupled to the mode controller 490 to control the LO frequencies and filter bandwidths, as necessary.

The transceiver 400 can be configured with a fixed uplink frequency band and associated bandwidth or a dynamically allocated uplink frequency band and associated bandwidth. In a system supporting a dynamically allocated uplink, the transceiver 400 can receive the uplink resource allocation in a predetermined downlink packet, message, block or channel. For example, a transceiver 400 operating in an IEEE802.16e wireless system receives uplink resource allocation in an Uplink-Map transmitted in a downlink frame or during a downlink subframe portion of a frame.

In some embodiments, the transceiver 400 is configured to continually emulate symmetric FDD operation and is configured to operate in a reduced emission mode. In other embodiments, the transceiver 400 can selectively transition FDD emulation, reduced emission mode, or some combination of the two.

In a default operating mode or condition in which the transceiver 400 is not configured for reduced transmit emissions, the transceiver 400 can be allocated uplink resources spanning substantially the entire actual uplink band.

In one embodiment, the transceiver 400 can selectively control a transition into symmetric FDD emulation mode. The transceiver 400 can transition modes or operating states based in part on information received in the downlink. For example, the transceiver 400 can transition to the symmetric FDD emulation mode based on a transition to a base station coverage region that includes asymmetric uplink and downlink bands, but requires symmetric FDD operation. The transceiver 400 may receive such indication, for example, in a registration message or a handoff message.

In another embodiment, the transceiver 400 can selectively control a transition into a reduced emissions mode. The transceiver 400 can transition modes or operating states based in part on information received in the downlink. For example, the transceiver 400 can transition to the reduced emissions mode based on an indication from the base station. Alternatively, the transceiver 400 can transition to the reduced emission mode based on a desired operating frequency band. For example, the transceiver 400 can operate in a reduced emissions mode any time when the uplink frequency band is either the C block or D block WCS bands. In other embodiments, the transceiver 400 can transition to the reduced emissions mode based on some other parameter or combination of parameters.

In one embodiment, the base station allocating uplink resources operates in a predetermined state where the transceiver 400 is operating FDD emulation or in the reduced emissions mode. In one embodiment, an IEEE802.16e OFDMA PHY base station allocating uplink resources operates in AMC mode.

For symmetric FDD emulation mode, the base station restricts the uplink resource allocations to those portions of the virtual uplink band that correspond to an actual uplink band. For reduced emissions mode, the base station restricts the uplink bandwidth to a portion of the available uplink bandwidth.

The base station can limit or otherwise restrict the uplink bandwidth by restricting which of the subcarriers to allocate to subscriber stations for uplink transmissions. The number and placement of the subcarriers can vary based on a variety of factors, including the portion of the virtual uplink band occupied by the actual uplink band, the location of the emissions band of interest and the total number of allocatable subcarriers.

The base station can limit the uplink bandwidth to a fraction of the total available operating bandwidth. For example, the base station can limit the uplink bandwidth to approximately ¾, ⅔, ½, ⅓, or ¼ of the full operating bandwidth. In other embodiments, the base station can limit the uplink bandwidth to some other fraction of the virtual bandwidth or operating bandwidth.

In reduced emissions mode, the base station can restrict the usable uplink band to the portion of the operating band furthest from the emission band of interest. Thus, where the emissions band of interest is higher or greater than the operating band, such as the case of the DARS band in relation to the WCS C block, the base station may limit the uplink band to the portion of the operating band at the lower end of the C block. Conversely, where the emissions band of interest is lower than the operating band, such as the case of the DARS band in relation to the WCS D block, the base station may limit the uplink band to the portion of the operating band at the higher end of the D block. Of course, the base station is not limited to any particular offset of the uplink band, and the offset can be fixed or programmable.

The transceiver 400 receives uplink resource allocations in the same manner regardless of whether the transceiver 400 is operating in symmetric FDD emulation mode, in reduced emissions mode, in a combination of symmetric FDD emulation and reduced emissions modes, or in a default, standard mode. For example, the receiver 480 receives a UL-MAP in the downlink frame or downlink subframe that allocates uplink resources to the transceiver 400 regardless of operating modes.

However, the transceiver 400 processes the uplink signals differently when in symmetric FDD emulation mode, in reduced emissions mode, or in a combination of symmetric FDD and reduced emissions modes. The transceiver 400 can perform a number of functions, either alone or in combination, based on the operating mode or combination of operating modes. For example, the mode controller 490 controls the bandwidth of the variable filter 440 to a reduced bandwidth in reduced emissions mode. The mode controller 490 also controls the offset of the frequency of the LO 482 from the frequency used in the standard mode based on whether symmetric FDD emulation mode is active and/or whether reduced emissions mode is active. The mode controller 490 can also control the remapping of the subcarriers to maintain the position of the allocated subcarriers. The mode controller 490 can perform a first remapping based on the symmetric FDD emulation mode and can perform a second remapping based on a reduced emissions mode. The mode controller 490 can be configured to apply the first and second remapping independently or in combination, depending on the mode of the transceiver 400.

Figure 5:
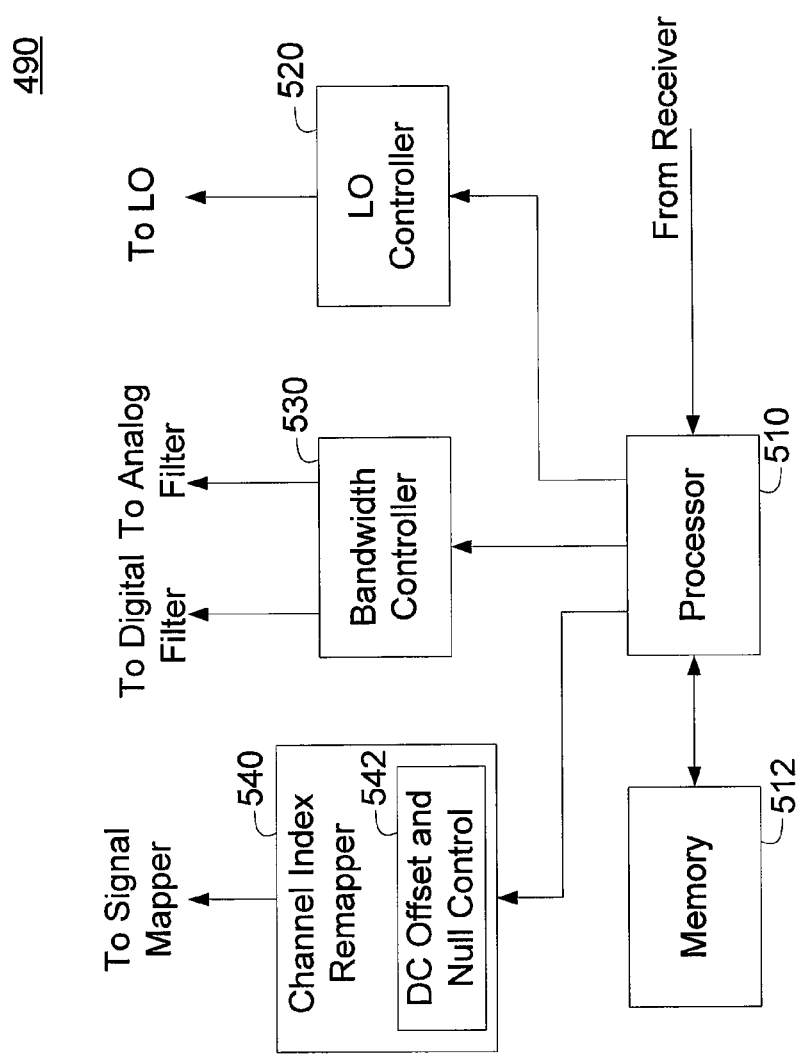
FIG. 5 is a simplified functional block diagram of an embodiment of a mode controller.

FIG. 5 is a simplified functional block diagram of an embodiment of a mode controller 490 for a transceiver. The mode controller 490 can be implemented in the transceiver embodiment of FIG. 4 to control the signal bandwidth, LO frequency offset, and subcarrier remapping to support one or both of symmetric FDD emulation or reduced emissions mode.

The mode controller 490 includes a processor 510 coupled to memory 512 or some other processor readable storage media. The processor 510 can operate in conjunction with one or more instructions and data stored in the memory 512 to configure the portions of the mode controller 490 that control each parameter varied when transitioning or operating a transceiver in reduced emissions mode.

The processor 510 is coupled to a plurality of control modules, each of which is configured to control one parameter that is varied during the transition or operation of the transceiver in reduced emissions mode. The processor 510 is coupled to an LO controller 520, a bandwidth controller 530, and a channel index remapper 540. Although each of the modules is depicted as a distinct module, other embodiments may integrate some or all of the functions of one or more of the modules in another module. Other embodiments may eliminate some of the control modules.

The processor 510 is configured to receive the uplink resource allocation from a receiver (not shown). The processor 510 can determine from the uplink resource allocation or from some other information, whether to transition to one or both of a symmetric FDD emulation mode, a reduced emissions mode, or a combination thereof. In some embodiments, the transceiver may always operate in one or both of the symmetric FDD emulation mode and reduced emissions mode, in which the processor 510 need not determine a transition to one or both modes. The processor 510 configures the various control modules to provide uplink signals over the allocated uplink resources.

The LO controller 520 is configured to offset the LO frequency relative to an operating frequency in the absence of symmetric FDD operation or reduced emissions mode. To support symmetric FDD emulation mode, the LO controller 520 can be configured to control the LO frequency based on a difference between a bandwidth of a virtual uplink band and an actual uplink band. To support reduced emissions mode, the LO controller 520 operates the LO based on a frequency offset of a center frequency of transmit signal relative to an uplink band center frequency.

The LO controller 520 can be, for example, a frequency synthesizer that controls an output frequency of a Voltage Controlled Oscillator (VCO). The LO controller 520 can receive from the processor 510 information or a control signal indicative of a desired frequency and can control the output frequency of a LO based on the information or control signal. In other embodiments, the LO controller 520 can be a Numerically Controlled Oscillator (NCO) or clock generator for an NCO, and the output signal or clock rate can be varied by the processor to control the output frequency of a LO. The LO controller 520 can have other implementations in other embodiments, depending on the manner in which the LO signal is generated.

The direction of the frequency offset is determined at least in part on the position of the actual uplink band relative to the virtual uplink band and the position of the emissions band of interest relative to the uplink band. The LO controller 520 can be configured to offset the frequency of the LO by the difference between the center frequencies of the virtual uplink band and the actual uplink band. In reduced emissions mode, the LO controller 520 operates to offset the LO frequency, and thus a center frequency of the transmit signal, in a direction that positions the transmit signal further away from the emission band of interest. The position of the emission band of interest may be known by the processor 510 by accessing relevant information in the memory 512. In other embodiments, the location of the emissions band of interest may be received in a control message from the receiver.

The magnitude of the frequency offset introduced by the LO controller 520 can be fixed or dynamically determined for each of the symmetric FDD emulation mode or reduced emissions mode. The magnitude of the LO offset for the symmetric FDD emulation mode is the magnitude of the difference between the center frequencies of the virtual uplink band and the actual uplink band.

The magnitude of the LO offset for the reduced emissions mode can be predetermined to be a frequency offset that places the edge of the transmit signal having the maximum allocatable bandwidth at the edge of the operating band. The transmit signal can have a bandwidth that is less than the full operational bandwidth, for example, one-half of the available bandwidth.

In the situation where the magnitude of the frequency offset introduced by the LO controller 520 is dynamic and selectable, the magnitude can be determined based in part on the uplink resource allocation. In one embodiment, the LO controller 520 can be configured to maximize the magnitude of the frequency offset. In such an embodiment, the LO controller 520 controls the magnitude of the offset to place the edge of the transmit signal at the edge of the operating band. The LO controller 520 increases the magnitude of the frequency offset as the bandwidth allocated for transmit signals decreases. Conversely, the LO controller 520 decreases the magnitude of the frequency offset as the bandwidth allocated for the transmit signal increases. The LO controller 520 can be configured to implement the frequency offset in fixed increments, and each increment can correspond to an OFDM subcarrier spacing.

The bandwidth controller 530 can reduce the bandwidth of the transmit signal relative to a standard or default bandwidth when the transceiver operates in reduced emissions mode. The bandwidth controller 530 can reduce the bandwidth of a baseband filter, IF filter, RF filter, or some combination thereof.

The bandwidth controller 530 can vary the component values of an analog filter, the tap values or tap lengths of a digital filter, or perform some other parameter control that is related to bandwidth control. In one embodiment, the bandwidth controller 530 is configured to vary the values of one or more varactors in an analog filter.

The bandwidth controller 530 can reduce the bandwidth of a filter by a fixed amount or a variable amount. For example, the bandwidth controller 530 can reduce the bandwidth of a baseband low pass filter to a bandwidth that is based on a maximum transmit bandwidth in the reduced emissions mode. For example, where the transmit signal in reduced emissions mode is a maximum of one-half the operational band, the bandwidth controller 530 can be configured to reduce the passband of a baseband low pass filter to approximately one-half the operational bandwidth.

In a situation where the bandwidth is controlled dynamically in the reduced emissions mode, the bandwidth controller 530 can be configured to reduce the bandwidth of a baseband low pass filter to the bandwidth of the signal allocated by the base station in the uplink resource allocation messages. In such an embodiment, the bandwidth controller 530 can adjust the bandwidth at a rate that coincides with the rate of the uplink resource allocations, such as every frame.

The bandwidth controller 530 reduces the signal bandwidth in the reduced emissions mode to a bandwidth that is less than the signal bandwidth needed to pass a transmit signal occupying substantially the full operating band. Thus, the transmit signal bandwidth in the reduced emissions mode is typically less than the bandwidth of a transceiver operating in a standard non-reduced emissions mode.

The reduced bandwidth results in reduced out of band emissions. For example, a reduced bandwidth in an analog baseband filter following the DAC reduces the undesired products output by the DAC including out of band DAC noise.

In another example, a reduced RF bandwidth in an analog RF output filter can reduce the level of out of band emissions, and particularly, the level of any out of band higher order distortion products generated in the final power amplifier stage.

The channel index remapper 540 operates to remap the indices of the allocated uplink subcarriers to compensate for the LO frequency offset. By remapping the indices of the allocated subcarriers, the transmitter can maintain the position of the allocated subcarriers in the presence of LO offset.

For example, the base station can allocate uplink subcarriers by referencing an index that identifies the subcarrier in a particular OFDM symbol format. The channel index remapper 540 can receive the indices of the allocated subcarriers from the processor 510 and can remap the subcarrier indices to compensate for the LO offset. The channel index remapper 540 supplies the remapped channel indices to a signal mapper used in the DFT portion of the transmitter, and the signal mapper need not have any knowledge of the remapping operation. This remapping function is described in more detail below with respect to FIGS. 6A-B.

The various symmetric FDD emulation techniques and emission reduction techniques, particularly the LO offset, do not affect the ability of the transceiver to maintain full compliance with an operating standard, such as the IEEE802.16e Wireless MAN OFDMA PHY operating standard, when operating in the symmetric FDD emulation mode, the reduced emissions mode, or a combination thereof. The base station need not have any knowledge of the symmetric FDD emulation mode or the emission reduction techniques implemented by the transceiver in the subscriber station. Instead, the base station need only operate in a predetermined operating mode, such as AMC in IEEE802.16e OFDMA PHY.

Figure 6A:
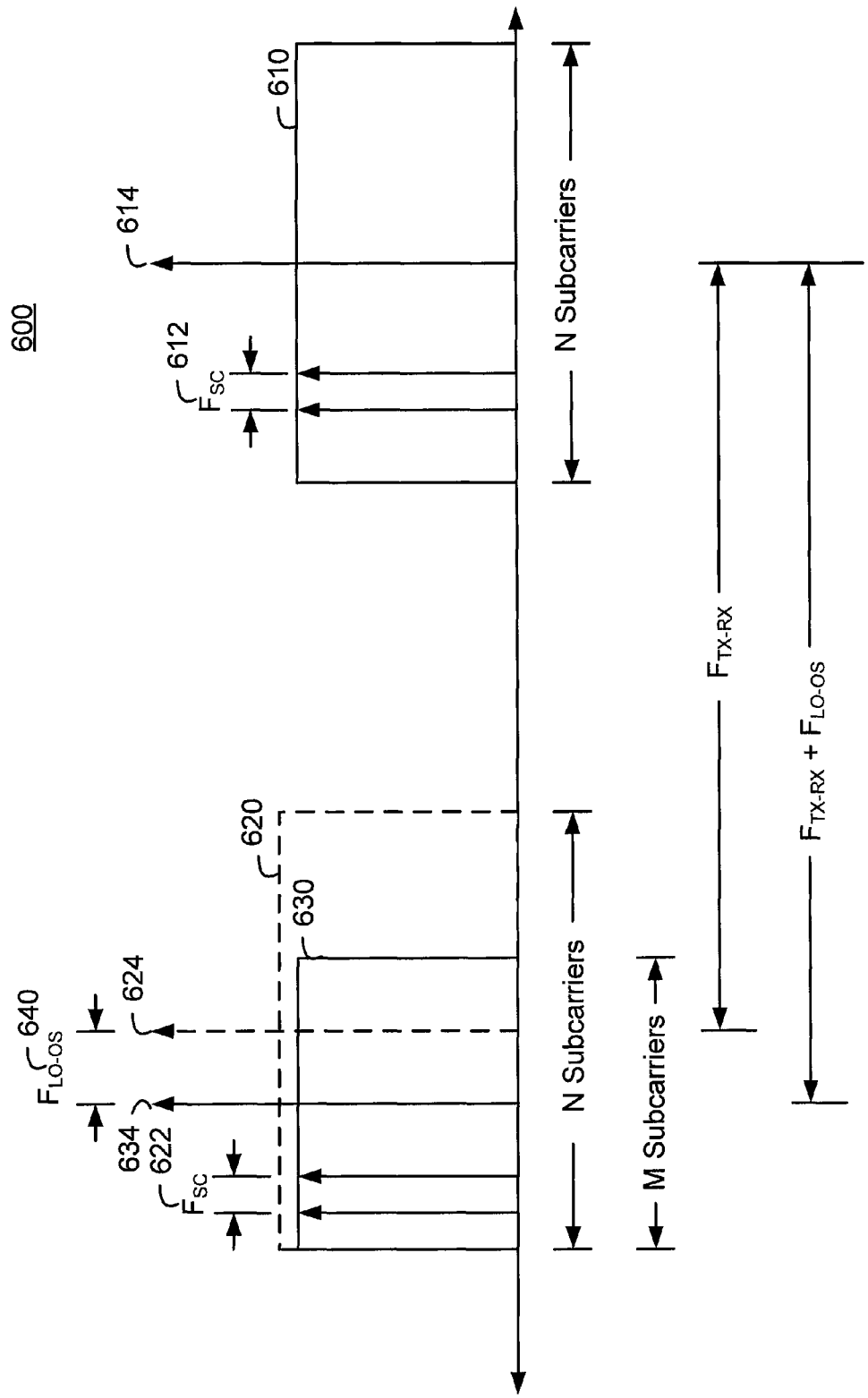
FIGS. 6A-6B are simplified spectrum diagrams for a FDD system.

FIG. 6A is a simplified spectrum diagram 600 illustrating a symmetric FDD emulation mode. The spectrum diagram 600 can represent, for example, a symmetric FDD emulation implemented by the transceiver of FIG. 4 operating in the spectrum shown in FIG. 2.

The spectrum diagram 600 illustrates a downlink frequency band 610 and an actual uplink frequency band 630 that has a bandwidth that is distinct from the bandwidth of the downlink frequency band 610. In the spectrum diagram 600 embodiment of FIG. 6, the actual uplink frequency band 630 is narrower than the downlink frequency band 610.

The downlink frequency band 610 has a center frequency 614 that can be, for example, the frequency of a LO used to frequency convert the signals in the downlink frequency band 610 to baseband. The downlink frequency band 610 is also capable of supporting, for example, N OFDM subcarriers at a subcarrier spacing 612 of $F_{sc}$.

A virtual uplink frequency band 620 is depicted in relation to the actual uplink frequency band 630. The virtual uplink frequency band 620 has a bandwidth that is substantially the same as the bandwidth of the downlink frequency band 610. The similarity in the bandwidths is such that the virtual uplink frequency band 620 can be considered symmetric to the downlink frequency band 610. The virtual uplink frequency band has a center frequency 624, which can correspond to the frequency of a LO used to upconvert baseband signals to the virtual uplink frequency band.

The virtual uplink frequency band 620, being symmetric with the downlink frequency band 610, is capable of supporting N OFDM subcarriers with a subcarrier spacing 622 of $F_{sc}$. Thus, the number of OFDM subcarriers capable of being supported in the virtual uplink band 630 is the same as the number of subcarriers that can be supported in the downlink frequency band 610, when the subcarrier spacing 622 in the virtual uplink frequency band is the same as the subcarrier spacing 612 in the downlink frequency band 610.

The actual uplink frequency band 630 has a center frequency 634 that can be, for example, a LO frequency used to upconvert baseband signals to the actual uplink frequency band. The actual uplink frequency band 630 can support fewer than N subcarriers with a subcarrier spacing 622 of $F_{sc}$. The difference in the vertical scale of the actual uplink frequency band 630 and the virtual uplink frequency band 620 is for purposes of illustration, and is not intended to reflect any amplitude differences between the two bands.

The transceiver receives an uplink resource allocation indexed relative to the virtual uplink band 630. The transceiver remaps the indices of the uplink resource allocation to the indices of the subcarriers in the actual uplink band 630. After remapping, the frequencies of the OFDM subcarriers in the resource allocations remain the same. The remapping only affects the subcarrier indices to reflect the center frequency offset 640 between the actual uplink band 630 and the virtual uplink band 620.

As an example, the virtual uplink band 620 supports N subcarriers centered about a center frequency 624. The left most (lowest frequency) subcarrier in the virtual uplink band 620 can be assigned an index value of zero. Each successive subcarrier is then numbered relative to the prior subcarrier, such that the subcarrier indices range from 0-(N−1).

The actual uplink band 630 is narrower than the virtual uplink band 630, but retains the subcarrier indices as if the actual uplink band 630 supported the same number of subcarriers as supported by the virtual uplink band 630. Thus, the subcarrier indices of the actual uplink band 630 would coincide with the indices of the subcarriers of the virtual uplink band 620 if the center frequencies 634 and 634, respectively, coincided.

Thus, it can be seen that the subcarrier indices in the actual uplink band 630 typically do not start at zero, but instead start at an index that can be determined based on the difference between the bandwidths of the actual uplink band 630 from the virtual uplink band 620. The index of a subcarrier in the virtual uplink band 630 can be remapped to an index in the actual uplink band 620, for example, by adding K/2, where K represents the difference between the number of subcarriers supported in the virtual uplink band, N, and the number of subcarriers supported in the actual uplink band, M.

As an example, the virtual uplink band may correspond to the lower A block and B block bands in combination with the C block band of the WCS band illustrated in FIG. 2. The actual uplink band may correspond to only the lower A block and B block bands. There is a difference of approximately 5 MHz between the virtual uplink band and the actual uplink band. The resource allocation in the virtual uplink band can be remapped to a resource allocation in the actual uplink band by adding the subcarrier index corresponding to the number of subcarriers that appear in a bandwidth of 2.5 MHz to the subcarrier index in the virtual uplink band.

Figure 6B:
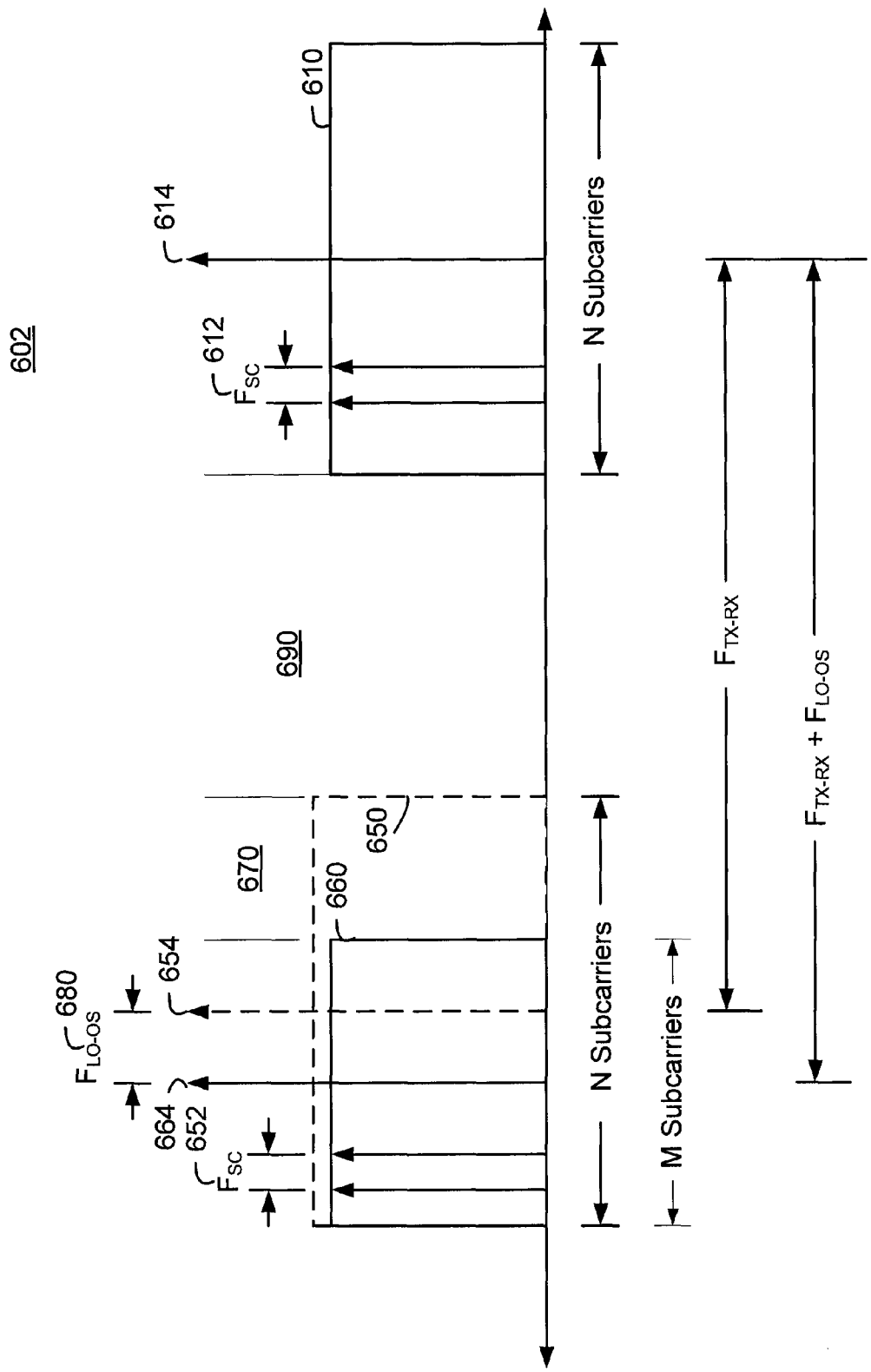

FIG. 6B illustrates a simplified spectrum diagram 602 for the LO offset and index remapping for reduced emissions mode. The LO offset and index remapping can be performed, for example, using the transceiver of FIG. 4 operating in the wireless communication system of FIG. 1.

The downlink frequency band is identical to that illustrated in FIG. 6A. The downlink frequency band 610 has a center frequency 614 that can be, for example, the frequency of a LO used to frequency convert the signals in the downlink frequency band 610 to baseband. The downlink frequency band 610 is also capable of supporting N OFDM subcarriers at a subcarrier spacing 612 of $F_{sc}$.

The uplink frequency band 650 having an associated center frequency 654 is illustrated as positioned in the spectrum adjacent to a constrained emissions band 690. In order to reduce the uplink emissions that fall within the constrained emissions band 690, the transceiver offsets the LO to a LO 664 corresponding to, for example, a center frequency of a reduced uplink band 660. The reduced uplink band 660 corresponds to a portion of the uplink frequency band 650.

The transceiver offsets the reduced uplink band 660 away from the constrained emissions band 690 by a guard band 670. The bandwidth of the guard band 670 corresponds approximately to the magnitude of the LO offset 680.

The transceiver receives uplink resource allocation having subcarriers indexed to uplink frequency band 650 and remaps the subcarrier indices to the indexing relative to the reduced uplink band 660. Using the same subcarrier indexing discussed above in relation to symmetric FDD emulation, the subcarriers indexed to the uplink frequency band 650 can be remapped to the indexing used in the reduced uplink band 660 by adding a value equal to approximately (N−M)/2, where N represents the number of subcarriers supported in the uplink frequency band 650 and M represents the number of subcarriers supported in the reduced uplink band 660.

The index remapping for reduced emissions mode can be performed before or after index remapping performed for symmetric FDD emulation. In the instance where both symmetric FDD emulation and reduced emissions are performed, the index remapping can be performed first for one mode and then remapped from the first remapped index to a second remapped index to accommodate the second mode.

Figure 7:
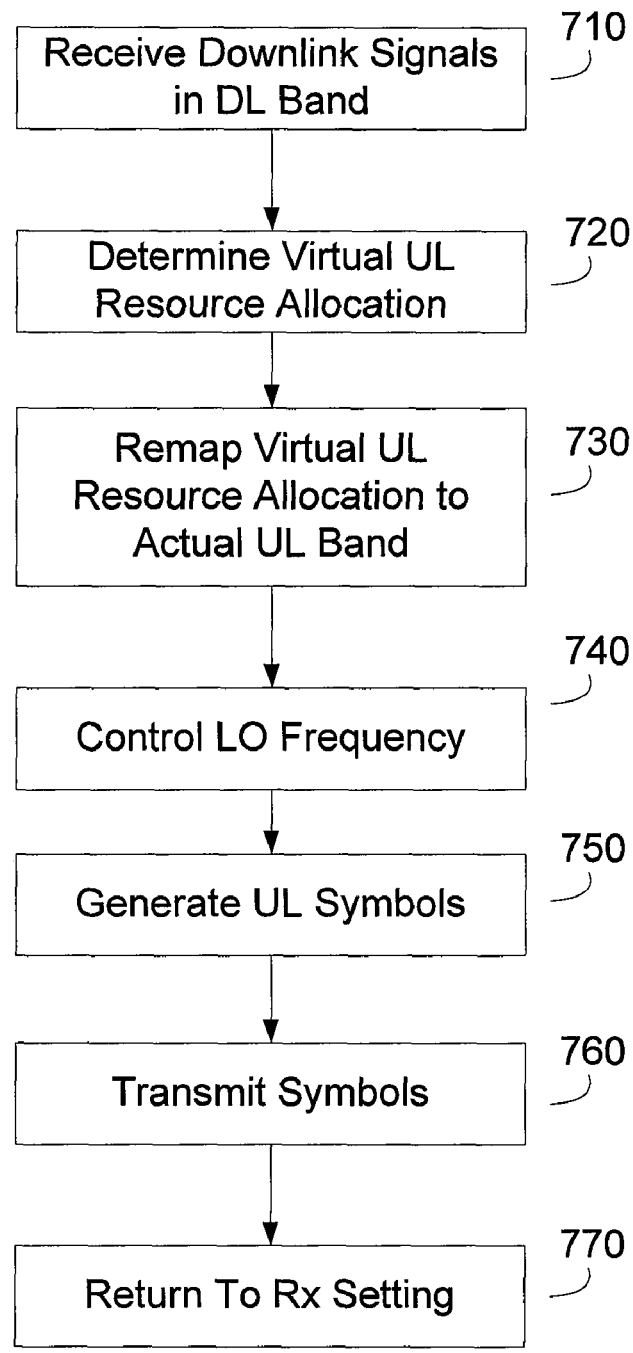
FIG. 7 is a simplified flowchart of a method of asymmetric FDD operation.

FIG. 7 is a simplified flowchart of an embodiment of a method 700 of asymmetric FDD operation with symmetric FDD emulation. The method 700 can be performed, for example, by the transceiver of FIGS. 3A-3B or FIG. 4.

The method 700 begins at block 710 where the transceiver receives downlink signals in a downlink band. The transceiver proceeds to block 720 and determines an uplink resource allocation from the downlink signals. The uplink resource allocation corresponds to a virtual uplink resource allocation in an asymmetric FDD system, where the transceiver is configured to perform symmetric FDD emulation.

The uplink resource allocation may be limited to that portion of the virtual uplink band that overlaps the actual uplink band. The uplink resource allocation may be limited, for example, by utilizing an AMC zone.

The transceiver proceeds to block 730 and remaps the subcarrier indices corresponding to the virtual uplink band to subcarrier indices in an actual uplink band. The transceiver has knowledge of the virtual uplink band and knowledge of the actual uplink band in which the uplink signal will be transmitted. The transceiver can remap the subcarrier indices based in part on the difference in the number of subcarriers supported in the virtual uplink band relative to the number of subcarriers supported in the actual uplink band. The transceiver can also remap the subcarrier indices based on the offset in center frequency of the virtual uplink band relative to the center frequency of the actual uplink band.

In embodiments in which the transceiver also remaps subcarriers to control uplink emissions, the transceiver may remap the subcarriers from an initial remapping performed during a reduced emissions mode of operation.

The transceiver proceeds to block 740 and can optionally control the LO frequency for the uplink signals. In a transceiver that supports H-FDD, the transceiver may use the same LO for the downlink processing and uplink processing, and the transceiver may reconfigure the LO frequency to when transitioning between downlink and uplink operations.

The transceiver proceeds to block 750 and generates the uplink OFDM symbols based on the remapped subcarrier indices. A symbol index, corresponding to the timing of the OFDM symbol, may not change because the uplink time allocation does not change due to the virtual uplink resource allocation.

The transceiver proceeds to block 760 and transmits the symbols generated using the remapped subcarrier indices on the actual uplink band. From the perspective of the base station that allocates the uplink resources, the uplink resources utilized by the transceiver correspond to those allocated. The remapping of subcarrier indices is not detected by the base station.

The transceiver proceeds to block 770 and returns to the receiver settings. It should be noted that in a full duplex FDD system, the transceiver may concurrently receive and transmit signals, and thus the process of reconfiguring the transceiver for receive operation may be omitted.

Figure 8:
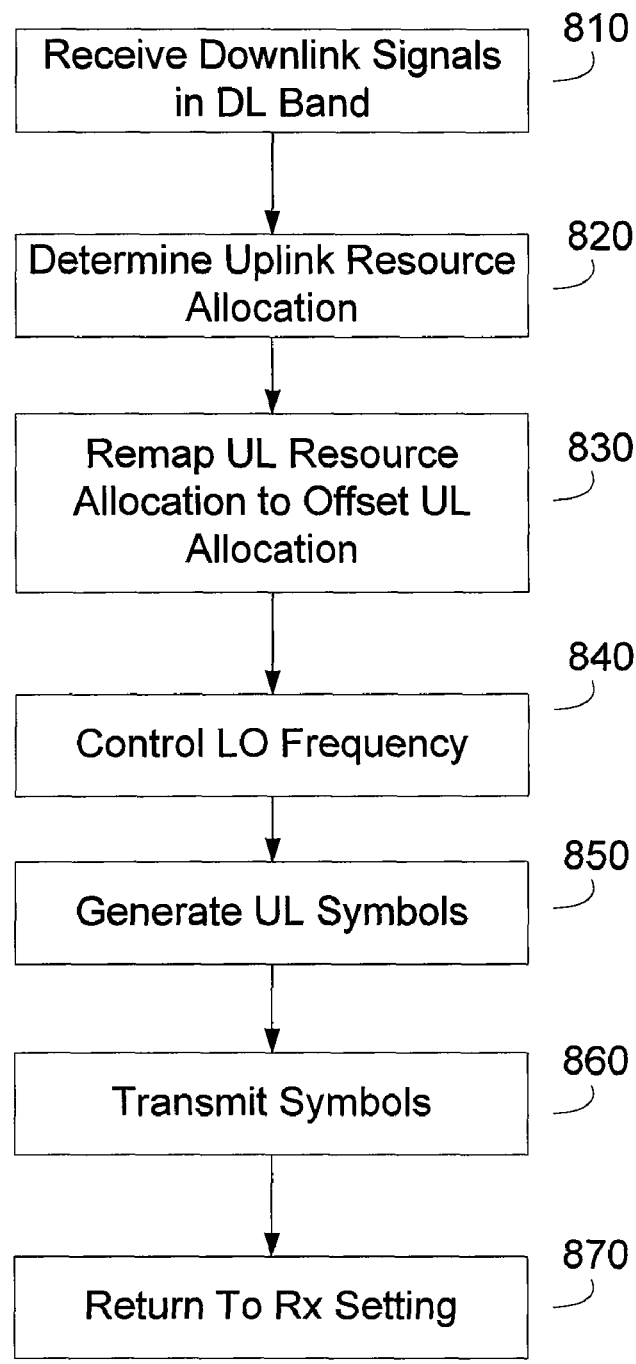
FIG. 8 is a simplified functional block diagram of a method of emission control in a FDD wireless device.

FIG. 8 is a simplified functional block diagram of a method 800 of emission control in a FDD wireless device. The method 800 can be performed, for example, by the transceiver of FIGS. 3A-3B or FIG. 4. The method 800 can be performed exclusive of any symmetric FDD emulation or may be performed in addition to symmetric FDD emulation.

The method begins at block 810 where the transceiver receives downlink signals in a downlink band. The transceiver proceeds to block 820 and determines an uplink resource allocation from the downlink signals. The uplink resource allocation corresponds to an uplink resource allocation in a reduced bandwidth portion of the uplink band. The uplink resource allocation may be limited to a reduced portion of the uplink band, for example, by utilizing an AMC zone.

The transceiver proceeds to block 830 and remaps the subcarrier indices of the full uplink band to subcarrier indices in the reduced uplink band. The transceiver has knowledge of the uplink band and knowledge of the reduced uplink band in which the uplink signal will be transmitted.

The transceiver can remap the subcarrier indices based in part on the difference in the number of subcarriers supported in the uplink band relative to the number of subcarriers supported in the reduced uplink band. The transceiver can also remap the subcarrier indices based on the offset in LO or center frequency of the uplink band relative to the LO or center frequency of the reduced uplink band.

In embodiments in which the transceiver also remaps subcarriers for symmetric FDD emulation, the transceiver may remap the subcarriers from an initial remapping performed during a symmetric FDD emulation mode of operation.

The transceiver proceeds to block 840 and can optionally control the LO frequency for the uplink signals. In a transceiver that supports H-FDD, the transceiver may use the same LO for the downlink processing and uplink processing, and the transceiver may reconfigure the LO frequency to when transitioning between downlink and uplink operations.

The transceiver proceeds to block 850 and generates the uplink OFDM symbols based on the remapped subcarrier indices.

The transceiver proceeds to block 860 and transmits the symbols generated using the remapped subcarrier indices on the reduced uplink band. From the perspective of the base station that allocates the uplink resources, the uplink resources utilized by the transceiver correspond to those allocated subcarriers. The remapping of subcarrier indices is not detected by the base station.

The transceiver proceeds to block 870 and returns to the receiver settings. It should be noted that in a full duplex FDD system, the transceiver may concurrently receive and transmit signals, and thus the process of reconfiguring the transceiver for receive operation may be omitted.

Methods and apparatus of symmetric FDD emulation and reduced uplink emissions control and reduction are described herein. A transceiver may emulate symmetric FDD operation to support asymmetric FDD in a system that specifies symmetric FDD operation.

The transceiver receives uplink resource allocation that correspond to a virtual uplink band. The transceiver remaps the resource allocation to reflect the subcarrier indices used in a actual uplink band. Typically, only subcarrier indices are remapped, as time indices corresponding to symbol times are not affected by the symmetric FDD emulation.

The transceiver may also operate in a reduced or controlled emissions mode by receiving uplink resource allocations, remapping the uplink resource allocation to a reduced uplink band. Generating symbols in the reduced uplink band using the remapped resources, and filtering the uplink signal to reflect a reduced uplink band that may be implemented by offsetting the LO used to frequency convert the symbols in the reduced uplink band.

The symmetric FDD emulation can support FDD as well as H-FDD systems, and can be used exclusive of, or in conjunction with, reduced uplink emissions mode.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of transmit emission control in a wireless transceiver, the method comprising:
    receiving wireless downlink signals in a downlink frequency band;
    determining a virtual uplink resource allocation within a virtual uplink frequency band that is distinct from the downlink frequency band and that has a substantially identical bandwidth as the downlink frequency band;
    remapping the virtual uplink resource allocation to an uplink resource allocation in an uplink frequency band that is narrower than the virtual uplink frequency band; and
    transmitting an uplink signal on the uplink resource allocation.

2. The method of claim 1, wherein receiving the wireless downlink signals comprises receiving downlink signals in a first time period exclusive of a second time period for transmitting the uplink signal.

3. The method of claim 1, wherein receiving the wireless downlink signals comprises receiving an uplink control message having the virtual uplink channel allocation.

4. The method of claim 1, further comprising filtering the uplink signal based on a bandwidth of the uplink resource allocation.

5. The method of claim 3, wherein the virtual uplink resource allocation is restricted to a portion of the virtual uplink frequency band corresponding to the uplink frequency band.

6. The method of claim 1, wherein a number and a spacing of subcarriers in the downlink frequency band coincide with a number and a spacing of subcarriers in the virtual uplink frequency band.

7. The method of claim 1, wherein remapping the virtual uplink resource allocation comprises:
configuring a Local Oscillator (LO) frequency at a frequency offset from a nominal LO frequency for the virtual uplink band; and
remapping the virtual uplink resource allocation based on the frequency offset.

8. The method of claim 1, wherein remapping the virtual uplink resource allocation comprises remapping a virtual uplink subcarrier index based in part on a difference between a number of subcarriers in the uplink frequency band and a number of subcarriers in the virtual uplink band.

9. The method of claim 1, further comprising nulling a predetermined subcarrier.

10. The method of claim 9, wherein the predetermined subcarrier comprises a DC subcarrier in the uplink frequency band.

11. The method of claim 9, wherein nulling the predetermined subcarrier comprises omitting symbols that map to a DC subcarrier in the uplink frequency band.

12. A method of transmit emission control in a wireless transceiver, the method comprising:
receiving wireless downlink signals in a downlink frequency band, wherein the downlink frequency band is distinct from an uplink frequency band;
determining an virtual uplink resource allocation based on a control message received in the downlink frequency band, the virtual uplink resource allocation restricted to a portion of the uplink frequency band;
remapping the virtual uplink resource allocation to an uplink resource allocation based on a frequency offset that is based in part on a difference between the uplink frequency band and the portion of the uplink frequency band to which the uplink resource allocation is restricted; and
transmitting an uplink signal over the uplink resource allocation.

13. The method of claim 12, wherein receiving wireless downlink signals comprises receiving the downlink signals in a receive time period that is distinct from a transmit time period.

14. The method of claim 12, further comprising filtering the uplink signal based in part on a bandwidth of the portion of the uplink frequency band to which the uplink resource allocation is restricted.

15. The method of claim 12, wherein remapping the virtual uplink resource allocation based on the frequency offset comprises remapping the uplink bandwidth allocation based on a frequency offset that positions a center frequency of the uplink frequency band away from a constrained emissions band.

16. A method of transmit emission control in a wireless transceiver, the method comprising:
receiving wireless downlink signals in a downlink frequency band having a first set of subcarriers;
determining a virtual uplink resource allocation within an uplink frequency band that is distinct from the downlink frequency band, wherein the uplink frequency band has a second set of subcarriers distinct from the first set of subcarriers, and wherein the uplink frequency band has a second bandwidth distinct from a first bandwidth of the downlink frequency band; and
transmitting an uplink signal in an uplink resource allocation associated with the virtual uplink resource allocation.

17. The method of claim 16, wherein receiving the wireless downlink signals comprises receiving downlink Orthogonal Frequency Division Multiplex (OFDM) symbols over the first set of subcarriers.

18. The method of claim 16, wherein receiving the wireless downlink signals comprises receiving the wireless downlink signals in a downlink time period exclusive of an uplink time period.

19. The method of claim 16, wherein determining the virtual uplink resource allocation comprises determining a subcarrier allocation in at least one uplink Orthogonal Frequency Division Multiplex (OFDM) symbol, the at least one uplink OFDM symbol having a distinct number of subcarriers from a downlink OFDM symbol.

20. The method of claim 16, wherein transmitting the uplink signal comprises transmitting an Orthogonal Frequency Division Multiplex (OFDM) symbol occupying an uplink bandwidth distinct from a downlink bandwidth.

* * * * *